(12) United States Patent
Yasui et al.

(10) Patent No.: US 7,071,638 B2
(45) Date of Patent: Jul. 4, 2006

(54) ACTUATOR CONTROL APPARATUS

(75) Inventors: Yuji Yasui, Wako (JP); Kanako Shimojo, Wako (JP); Eijiro Shimabukuro, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 152 days.

(21) Appl. No.: 10/743,464

(22) Filed: Dec. 23, 2003

(65) Prior Publication Data

US 2004/0145321 A1 Jul. 29, 2004

(30) Foreign Application Priority Data

Dec. 26, 2002 (JP) ............................. 2002-378624
Mar. 28, 2003 (JP) ............................. 2003-089777

(51) Int. Cl.
*H02K 41/00* (2006.01)

(52) U.S. Cl. ...................................................... 318/135

(58) Field of Classification Search ................ 318/135, 318/266, 466, 626
See application file for complete search history.

(56) References Cited

U.S. PATENT DOCUMENTS 6,046,878 A * 4/2000 Liu et al. ....................... 360/75
6,571,135 B1 * 5/2003 Bergold et al. ................ 700/42
6,810,768 B1 * 11/2004 Comfort et al. ............... 74/582

FOREIGN PATENT DOCUMENTS

JP          2002-195406          7/2002

* cited by examiner

*Primary Examiner*—Karl Tamai
*Assistant Examiner*—Judson H. Jones
(74) *Attorney, Agent, or Firm*—Arent Fox PLLC

(57) ABSTRACT

An actuator control apparatus is provided, capable of causing a state value which changes according to the action of an actuator to match a prescribed target value. A synchronizing mechanism is modeled as the collision of an inertial system object and an elastic system object, and taking as a state amount the deviation between the actual position (Psc) of a coupling sleeve and the target position (Psc_cmd), a computation coefficient (VPOLE) of a switching function used in sliding mode control which takes the state amount as a variable is, in a first process until the coupling sleeve makes contact with a synchronizer ring, set according to the actual position (Psc) of the coupling sleeve, and in a process until the coupling sleeve engages a synchronized gear, is set such that the pressing force of the coupling sleeve matches a target pressing force.

17 Claims, 16 Drawing Sheets a : VPOLE = -1
b : VPOLE = -0.8
c : VPOLE = -0.5

(Prior Art)

ACTUATOR CONTROL APPARATUS

BACKGROUND OF THE INVENTION

1. Field of the Invention

This invention relates to an actuator control apparatus which controls the operation of an actuator such that a state value, which changes according to operation of the actuator, coincides with a target value.

2. Description of the Related Art

One well-known mechanism which is driven by an actuator is, for example, as shown in FIG. 16, a synchronizing mechanism 110 of a transmission, in which a synchronizer ring 103 is provided between a coupling sleeve 101 which rotates integrally with an input shaft 100 connected to an automobile engine and a synchronized gear 102 provided rotatably but immovably along the shaft on the input shaft 100 connected to a driving wheel (not shown), such that by moving the coupling sleeve 101 by means of the actuator 105 through a shift fork 104, the coupling sleeve 101 and synchronized gear 102 can be switched between connection and disconnection.

In the synchronizing mechanism 110, the coupling sleeve 101 has a hollow construction, and a spline 111 is formed on the inner surface of the hollow portion. Also, a spline 112, capable of engaging with the spline 111 of the coupling sleeve 101, is formed on the outer surface of the synchronizer ring 103, and a spline 113 capable of engaging with the spline 111 of the coupling sleeve 101 is formed on the outer surface of the portion of the synchronized gear 102 opposing the synchronizer ring 103.

When the coupling sleeve 101 and the synchronized gear 102 are connected, the coupling sleeve 101 is moved in the direction of the synchronized gear 102 by the shift fork 104. When the coupling sleeve 101 and synchronizer ring 103 make contact with each other and the synchronizer ring 103 is pressed against the synchronized gear 102, the friction force occurring between the synchronizer ring 103 and the synchronized gear 102 causes the rotation speed of the synchronized gear 102 to be increased or decreased.

As a result, the rate of rotation of the coupling sleeve 101 and the rate of rotation of the synchronized gear 102 are synchronized, the spline 111 of the coupling sleeve 101 is engaged with the spline 112 of the synchronizer ring 103, and moreover the coupling sleeve 101 is moved, and the spline 111 of the coupling sleeve 101 is engaged with the spline 113 of the synchronized gear 102.

Here, if the speed of motion of the coupling sleeve 101 is too fast when the coupling sleeve 101 presses the synchronizer ring 103 against the synchronized gear 102, the coupling sleeve 101 may rebound when the coupling sleeve 101 makes contact with the synchronizer ring 103, or the coupling sleeve 101 may be pressed against the synchronized gear 102 with excessive force, so that the synchronizing mechanism 110 may be damaged.

Hence in the prior art, when the coupling sleeve 101 is moved in the direction of the synchronized gear 102, the speed of motion of the coupling sleeve 101 was reduced when the distance between the two became less than a prescribed value. Also, methods are known in which a spring or other mechanical cushioning mechanism is provided between the actuator 105 and shift fork 104, to reduce the shock at the time of contact of the coupling spring 101 and the synchronizer ring 103 (see for example Japanese Patent Laid-open No. 2002-195406).

From the time the coupling sleeve 101 makes contact with the synchronizer ring 103 until the time engaging of the coupling sleeve 101 and the synchronized gear 102 is completed, it is necessary to press the coupling sleeve 101 against the synchronizer ring 103; but if the pressing force is excessive, damage to the synchronizing mechanism 110 may occur. Consequently the operation of the actuator 105 must be controlled such that the pressing force reliably matches a preset target level.

SUMMARY OF THE INVENTION

The present invention was devised in light of the above background, and has as an object the provision of an actuator control apparatus capable of reliably matching a state value, which changes according to the action of the actuator, with a prescribed target value. A further object is the provision of a control apparatus which suppresses instability in actuator behavior when switching the type of state value to be controlled.

A first embodiment of this invention is characterized in comprising first state value ascertaining means, which ascertains a first state value which changes according to the operation of the actuator; second state value ascertaining means, which ascertains a second state value, differing from the first state value, and which changes according to the operation of the actuator; and operation amount determining means, which uses first response specifying control capable of variably specifying the attenuation behavior and attenuation speed of the deviation of the first state value from the first target value such that the above first state value matches the first target value, taking at least this deviation as the first state amount, to determine a first operation amount which drives the above actuator such that the first state amount converges on an equilibrium point of a first switching function stipulated by a first linear function which takes the first state amount as a variable, and which determines the response characteristic of the above first response specifying control such that the above second state value matches the second target value.

According to this invention, when for example a disturbance is applied to the above actuator, and it is difficult to eliminate the effect of the disturbance through the above first response specifying control based on the above first state value, by determining the response characteristic of the above first response specifying control such that the above second state value matches the above second target value, the effect of the above disturbance can be excluded.

Further, the above operation amount determining means is characterized in determining the response characteristic of the above first response specifying control such that the above second state amount converges on an equilibrium point of the second switching function stipulated by the second linear function taking the second state amount as a variable, using second response specifying control capable of variably specifying the attenuation behavior and attenuation speed of deviation of the above second state value from the above second target value, taking at least this deviation as the second state amount.

According to this invention, by using the above second response specifying control to determine the response characteristic of the above first response specifying control, the response characteristic of the above first response specifying control can be made to converge on the target response characteristic in a short time, without divergence, so that the action of the above actuator can be further stabilized.

Further, the above operation amount determining means is characterized in that the response characteristic of the above first response specifying control is determined by modifying the computation coefficient of the above first linear function.

According to this invention, as described in detail below, the ability to suppress disturbances changes when the computation coefficient of the above first linear function is modified. Consequently the above operation amount determining means can easily modify the response characteristic of the above first response specifying control by modifying the computation coefficient.

Further, the above operation amount determining means is characterized in taking the above computation coefficient as a second operation amount, and in determining the second operation amount such that the above second operation amount converges on an equilibrium point of the above second switching function.

According to this invention, the above operation amount determining means can determine the response characteristic of the above first response specifying control by causing the above computation coefficient to converge in a short time on a target value without divergence, so that action of the above actuator can be stabilized and controlled.

Further, the above actuator is characterized in that the actuator is a driving source which causes motion of a moveable body, in that the above first state value is the motion position of the above moveable body, and in that the above second state value is the magnitude of the force acting on the above moveable body by the action of the above actuator.

According to this invention, by setting the response characteristic of the above first response specifying control which controls the position of the above moveable body, the magnitude of the force acting on the above moveable body can be controlled. In this way, through the above first response specifying control which is a first control system, two state values, which are the position of motion of the above moveable body and the magnitude of the force acting on the above moveable body, are controlled, and by this means switching of control between the two state values can be performed smoothly compared with the case of switching between separate control systems for the two state values.

Further, the above actuator is characterized in having target position setting means, connected to a contact body provided moveably in one axis direction and which moves the contact body, which controls the action of a contact mechanism comprising the contact body, the above actuator, and a contacted body which makes contact with the contact body when the contact body moves to a prescribed position, which executes a process of moving the above contact body past the above prescribed position to press against the above contacted body by means of the above actuator, and which sets the target position of the above contact body in this process as the above first target value; in having, as the above first state value ascertaining means, actual position ascertaining means which ascertains the actual position of the above contact body as the above first state value; and in having, as the above second state value ascertaining means, pressing force ascertaining means which ascertains the force pressing on the above contacted body by the above contact body as the above second state value.

According to this invention, the above operation amount determining means determines the response characteristic of the above first response specifying control such that the actual position of the above contact body converges on the above target position due to the above first response specifying control, and in addition the pressing force ascertained by the above pressing force ascertaining means matches the target pressing force. Consequently while causing the traversed positions through which the above contact body moves to converge on the above target position, the pressing force applied by the above contact body to the above contacted body can be maintained at the above target pressing force. As a result, excessive values of the pressing force applied by the above contact body to the above contacted body can be prevented, and the above contact body can be made to press with stability against the above contacted body.

Further, the above actuator is characterized in that the actuator is an electrical actuator the output of which changes according to the magnitude of a supplied current, in that the above first operation amount is the voltage supplied to the electrical actuator, and in that the above pressing force ascertaining means detects the current supplied to the electrical actuator and ascertains the force pressing against the above contacted body by the above contact body based on the supplied current.

According to this invention, the above pressing force ascertaining means can easily ascertain the pressing force applied by the above contact body to the above contacted body based on the detected value of the current supplied to the above actuator. And, the above operation amount determining means can easily adjust the pressing force applied by the above contact body to the above contacted body, by adjusting the voltage supplied to the above actuator as the above first operation amount.

The above contact mechanism is characterized in being a synchronizing mechanism which switches between power transmission and disconnection, and in being a first engaging member provided in integrally rotatable fashion on the shaft of the above contact body; and the above contacted body is characterized in being a synchronizing member, provided between a second engaging member which can rotate relative to the above shaft and cannot move along the shaft and the first engaging member, capable of free rotation with respect to the first engaging member and the second engaging member and freely movable in the direction of the above shaft, and which, through the friction force occurring upon contact of the first engaging member and the second engaging member in a state of rotation of the above shaft, can synchronize the rates of rotation of the first engaging member and the second engaging member, and engage the first engaging member and the second engaging member.

According to this invention, when the above first engaging member is pressed against the above synchronizing member and caused to engage with the above second engaging member by the above actuator, the above operation amount determining means determines the above first operation amount such that the actual position of the above first engaging member matches the above target position, and also sets the above computation coefficient such that the pressing force on the above synchronizing member by the above first engaging member matches the above target pressing force. As a result, the occurrence of excessive pressing forces on the above synchronizing member by the above first engaging member, and the occurrence of damage to the above synchronizing member, are prevented, and the above first engaging member and the above second engaging member can be caused to engage reliably.

A second embodiment of this invention is characterized in comprising first state value ascertaining means, which ascertains a first state value which changes according to the action of an actuator; second state value ascertaining means, which ascertains a second state value, different from the first state value which changes according to the action of the actuator; and operation amount determining means, which uses response specifying control capable of variably specifying the attenuation behavior and attenuation speed of the deviation of the first state value from a first target value to determine an operation amount for driving the above actuator such that, at least, the value of a switching function stipulated by a linear function based on the deviation is made to converge on zero, so that the above first state value matches the above first target value, and in addition switches between setting the response characteristic of the above response specifying control either according to the above first state value, or such that the above second state value matches a second target value.

According to this invention, in a control system using the above response specifying control to cause the above first state value to match the above first target value, by modifying the response characteristic of the above response specifying control, control can be performed causing the above second state value to match the above second target value. In this case, control of the above first state value and control of the above second state value can be performed by one control system, so that switching between control systems is unnecessary, and there is no instability in the action of the above actuator arising from switching between control systems. Consequently switching between control of the above first state value and control of the above second state value can be performed with stability.

Further, the above operation amount determining means is characterized in that the response characteristic of the above response specifying control is set by modifying a computation coefficient of the above linear function.

According to this invention, as described in detail below, the ability to suppress disturbances changes when the computation coefficient of the above first linear function is modified. Consequently by modifying the computation coefficient, the above operation amount determining means can easily modify the response characteristic of the above first response specifying control.

Further, the above actuator is characterized in being a driving source which causes a moveable body to move, in that the above first state value is the position of motion of the above moveable body, and in that the above second state value is the magnitude of the force acting on the above moveable body through the action of the above actuator.

According to this invention, by modifying the response characteristic of the above first response specifying control which controls the position of the above moveable body, the magnitude of the force acting on the above moveable body can be easily controlled. And, two state values, which are the position of motion of the above moveable body and the magnitude of the force acting on the above moveable body, can be controlled by the above first response specifying control, which is a single control system.

Further, the above actuator is characterized in having target position setting means, connected to a contact body provided moveably in the direction of one shaft and which moves the contact body, controls a contact mechanism comprising the contact body, the above actuator, and a contacted body which makes contact with the contact body when the contact body is moved to a prescribed position, and executes a first process of moving the above contact body by means of the actuator, from a state in which the above contact body and the above contacted body are opposing with an interval therebetween, to make contact with the above contacted body, and a second process in succession to the above first process of moving, by means of the above actuator, the above contact body beyond the above prescribed position to press the above contacted body, to set a target position for the above contact body in the above first process and in the above second process; in having, as the above first state value ascertaining means, actual position ascertaining means which ascertains the actual position of the above contact body as the above first state value; and in having, as the above second state value ascertaining means, pressing force ascertaining means which ascertains as the above second state value the force pressing against the above contacted body by the above contact body; and is further characterized in that the above operation amount determining means, in the above first process, sets the response characteristic of the above response specifying control according to the actual position of the above contact body, and in the above second process, sets the response characteristic such that the pressing force ascertained by the above pressing force ascertaining means so as to match a prescribed target pressing force.

According to this invention, the above operation amount determining means, in the above first process, sets the response characteristic of the above response specifying control according to the actual position of the above contact body, causing the elasticity of the above contact mechanism to change, and in the above second process, sets the response characteristic of the above response specifying control such that the pressing force of the above contact body against the above contacted body matches the above target pressing force. And, by modifying a single setting condition, which is the response characteristic of the above response specifying control, to perform control of the elasticity of the above contact mechanism in the above first process and control of the pressing force of the above contact body in the above second process, transition from the above first process to the above second process is performed with stability, and instability in the behavior of the above contact mechanism at the time of transition can be suppressed.

Further, the above operation amount determining means is characterized in that, when the degree of deviation of the actual position of the above contact body from the above target position in the above first process increases to be equal to or greater than a first prescribed level, processing is initiated to set the response characteristic of the above response specifying control such that the pressing force ascertained by the above pressing force ascertaining means matches the above target pressing force.

According to this invention, until the above contact body makes contact with the above contacted body, the actual position of the above contact body tracks rapidly to the target position, so that the degree of deviation of the actual position of the above contact body from the above target position is small. And, when the above contact body makes contact with the above contacted body, movement of the above contact body is suppressed by the reaction force from the above contacted body, so that the degree of deviation of the actual position of the above contact body from the above target position increases suddenly. Consequently when the degree of deviation of the actual position of the above contact body from the above target position increases to be equal to or greater than the above first prescribed level, the above operation amount determining means detects that the above contact body and the above contacted body have made contact, and initiates processing, which is processing corresponding to the above second process, to set the response characteristic of the above response specifying control such that the pressing force ascertained by the above pressing force ascertaining means matches the above target pressing force.

Further, the above operation amount determining means is characterized in that, when in the above second process the degree of deviation of the actual position of the above contact body from the above target position decreases to be equal to or greater than a second prescribed level, the above operation amount is determined such that movement of the above contact body is halted.

According to this invention, when in the above second process the reaction force from the above contacted body decreases, the velocity of motion of the above contact body increases and the degree of deviation of the actual position of the above contact body from the above target position suddenly decreases. And, such a decrease in the reaction force from the above contacted body occurs when, for example, the above contact body passes the above contacted body. In this case, by determining the above operation amount so as to halt motion of the above contact body, the above operation amount determining means can halt the motion of the above contact body and protect the above contact mechanism.

Further, the above operation amount determining means is characterized in that, when in the above second process the degree of deviation of the actual position of the above contact body from the above target position decreases to be equal to or greater than the above second prescribed level, the response characteristic of the above response specifying control is set in the direction of increasing ability to suppress disturbances.

According to this invention, by modifying the response characteristic of the above response specifying control in the direction of increasing ability to suppress disturbances, the behavior of the above contact body can be stabilized, and the above contact body can be easily halted.

Further, the above operation amount determining means is characterized in that the degree of deviation of the actual position of the above contact body from the above target position is ascertained based on the converted value resulting from filtering, using a wavelet transform, of time-series data for the deviation between the actual position of the above contact body and the target position.

According to this invention, as described in detail below, when the above filtering of the time-series data of the deviation between the actual position of the above contact body and the target position is performed, the high-frequency noise component of the deviation is eliminated, and the SN ratio of fluctuations in the low-frequency components is improved. Consequently the above operation amount determining means can ascertain with better precision the degree of deviation of the actual position of the above contact body from the target position, based on the converted value resulting from filtering.

Further, the above contact mechanism is characterized in that the above contact mechanism is a synchronizing mechanism which switches between power transmission and disconnection; in that the above contact body is a first engaging member provided in integrally rotatable fashion on a shaft; and that the above contacted member is a synchronizing member which is provided between a second engaging member which can rotate relative to the above shaft and cannot move along the shaft and the first engaging member, in a manner enabling free rotation with respect to the first engaging member and second engaging member and also free movement along the direction of the above shaft, such that when the above shaft is rotating, the friction force arising from contact with the first engaging member and the second engaging member causes the rates of rotation of the first engaging member and the second engaging member to be synchronized, so that the first engaging member and the second engaging member can be engaged.

According to this invention, the shock which occurs when the above first engaging member makes contact with the above synchronizing member (the above first process) can be alleviated, the rates of rotation of the above first engaging member and the above second engaging member are synchronized through the above synchronizing member, and the pressing force of the above first engaging member against the above synchronizing member in the process of engaging the above first engaging member and the above second engaging member (the above second process) can be maintained at the above target pressing force, so that the above first engaging member and the above second engaging member can be engaged with stability. Further, when the above first engaging member and the above second engaging member are engaged, and the reaction force from the above synchronizing member on the above first engaging member is reduced, the above operation amount is determined such that motion of the above first engaging member is halted, and as a result pressing of the above first engaging member into the above synchronizing member with excessive force can be prevented.

DESCRIPTION OF THE PREFERRED EMBODIMENTS

Figure 1:
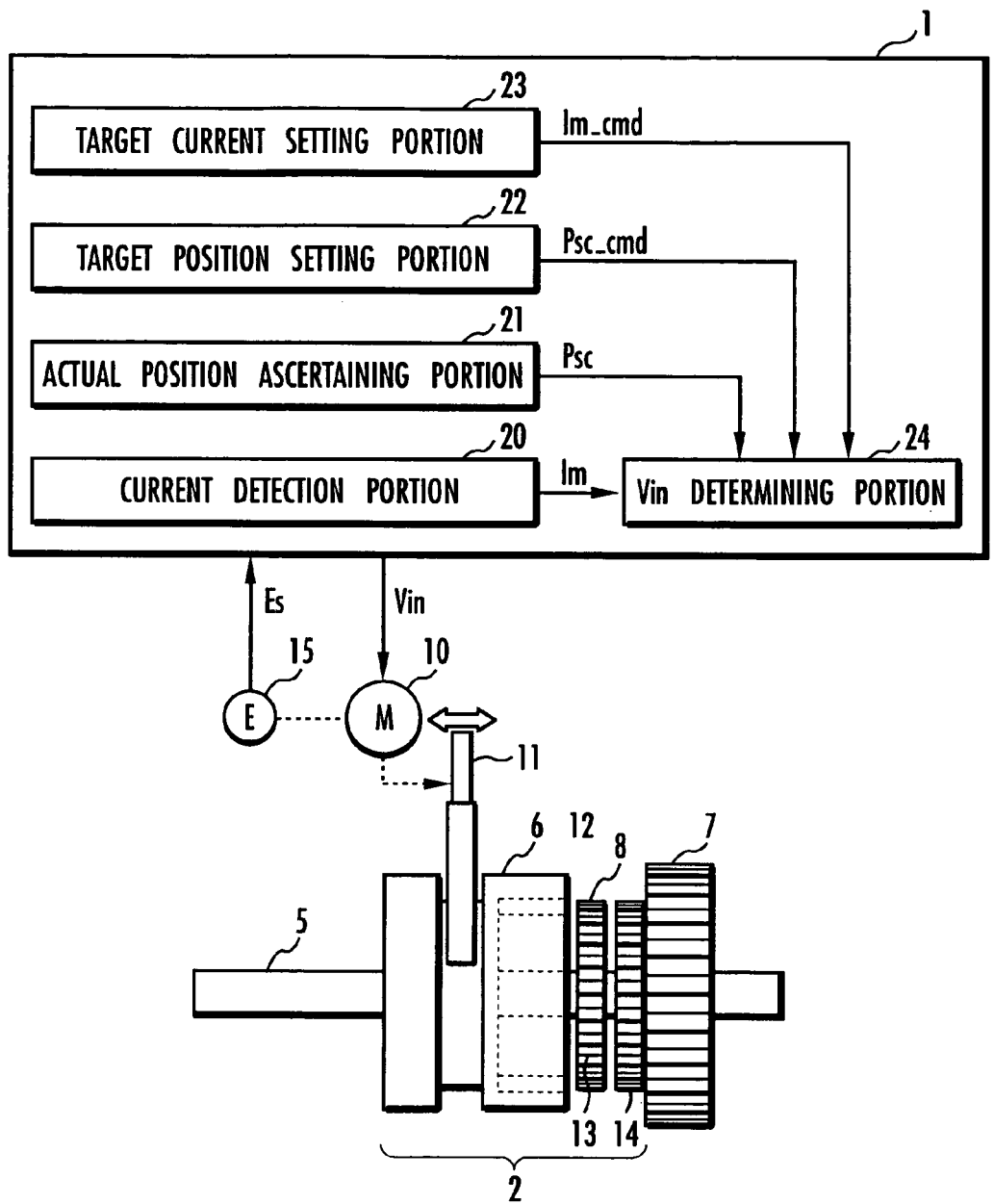
FIG. 1 is a drawing of the configuration of a synchronizing mechanism and control apparatus thereof.
Figure 2:
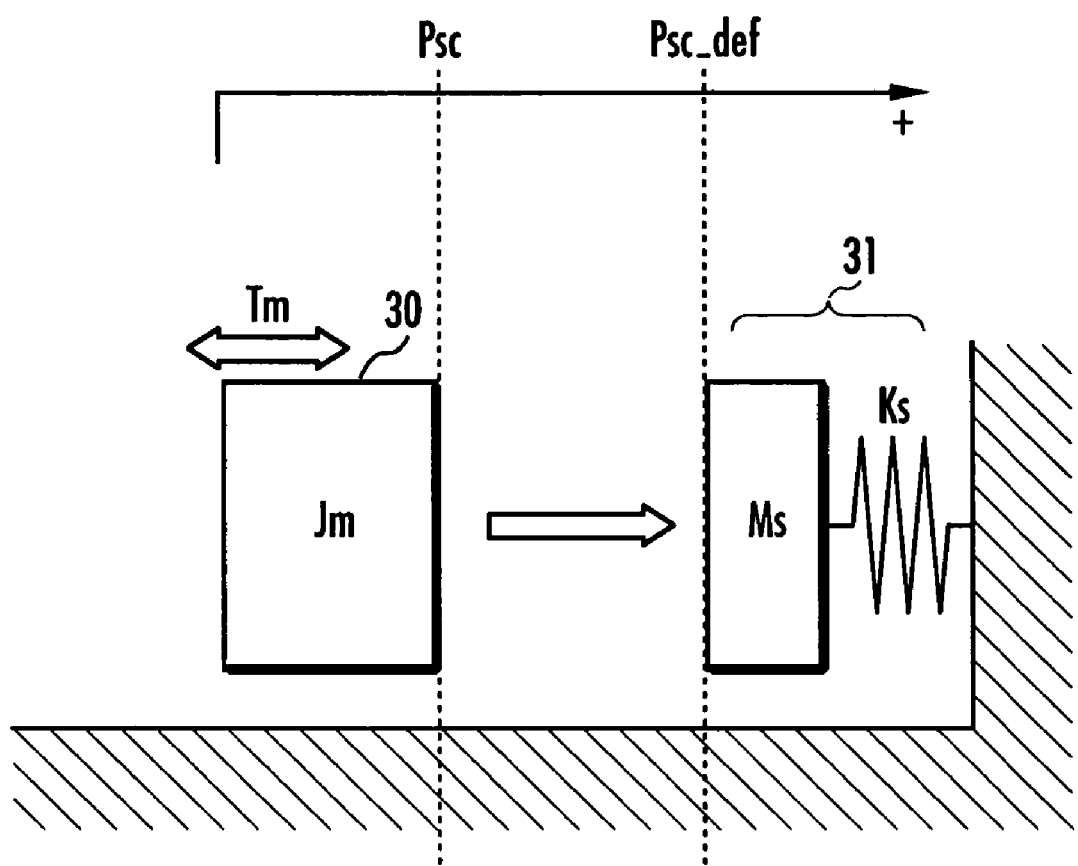
FIG. 2 is a drawing explaining the modeling of the synchronizing mechanism shown in FIG. 1.
Figure 3:
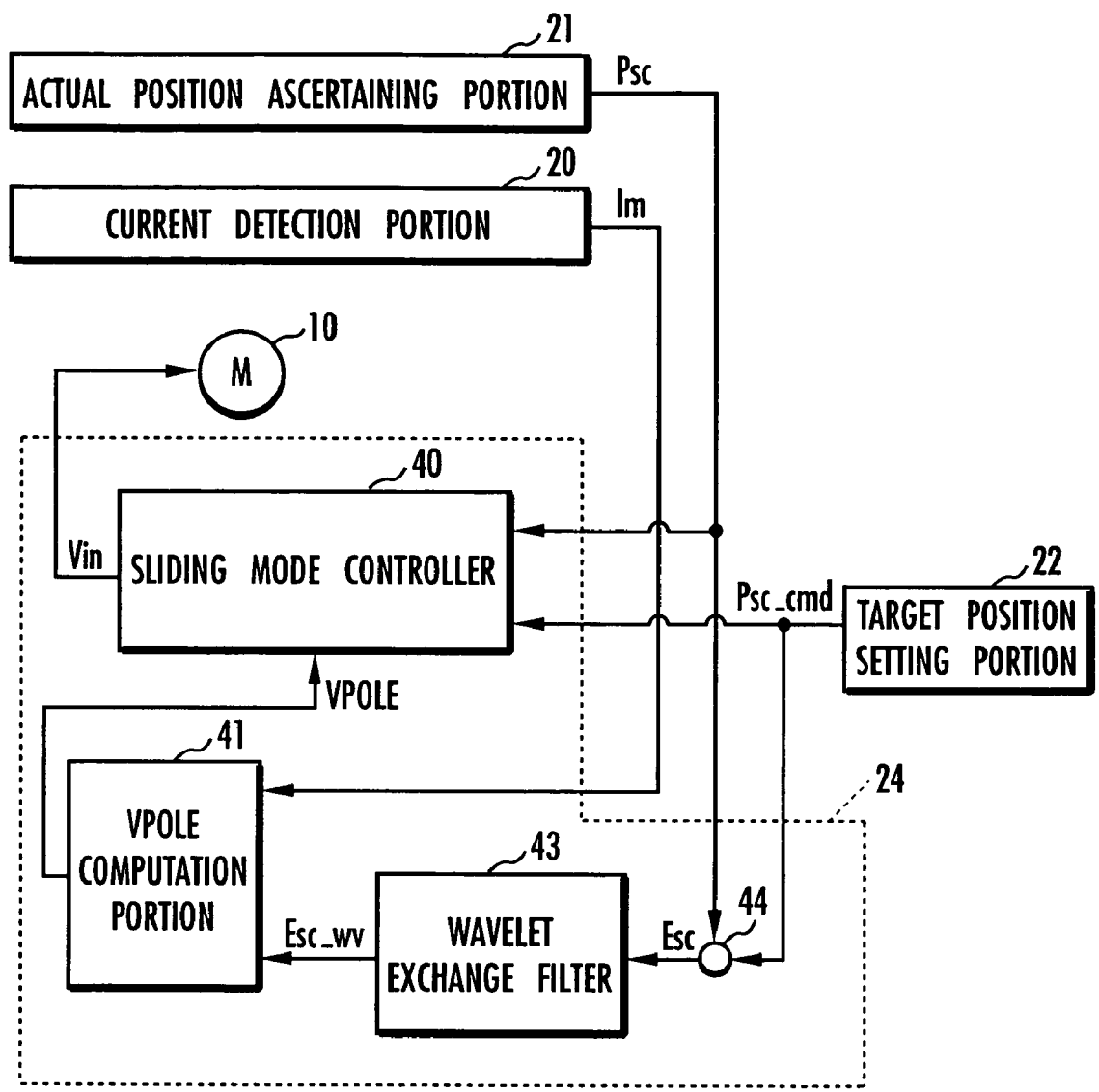
FIG. 3 is a control block diagram of the control apparatus shown in FIG. 1.
Figure 4:
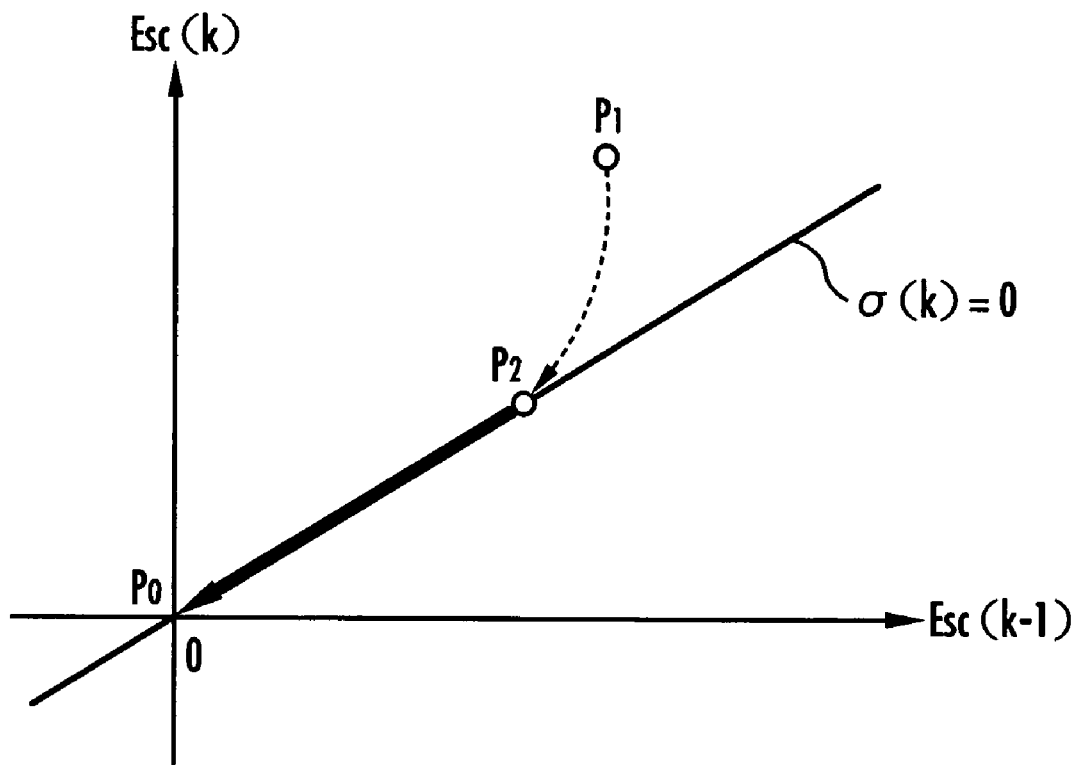
FIG. 4 is a graph showing the operation of the sliding mode controller shown in FIG. 3.
Figure 4:
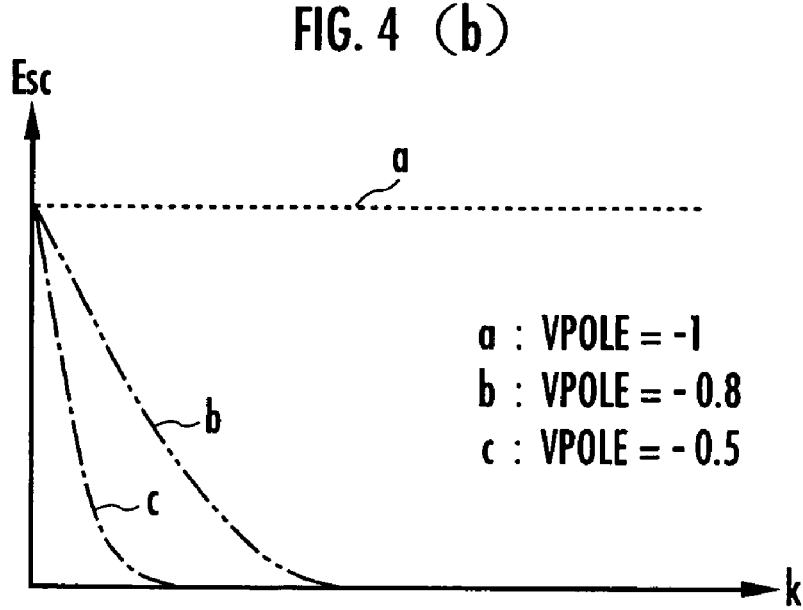
Figure 5:
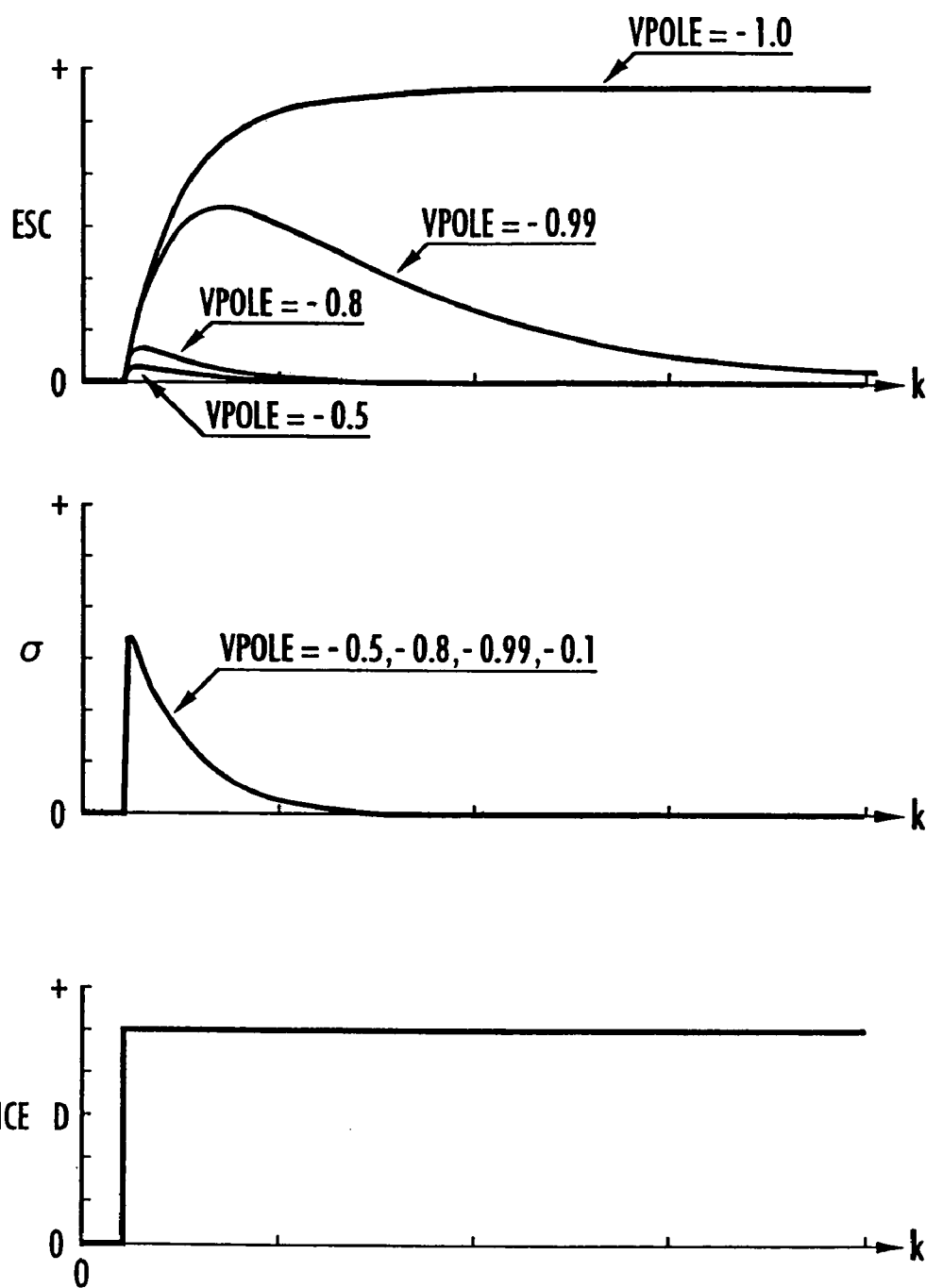
FIG. 5 is a graph showing the effect of modification of the compliance parameter.
Figure 6:
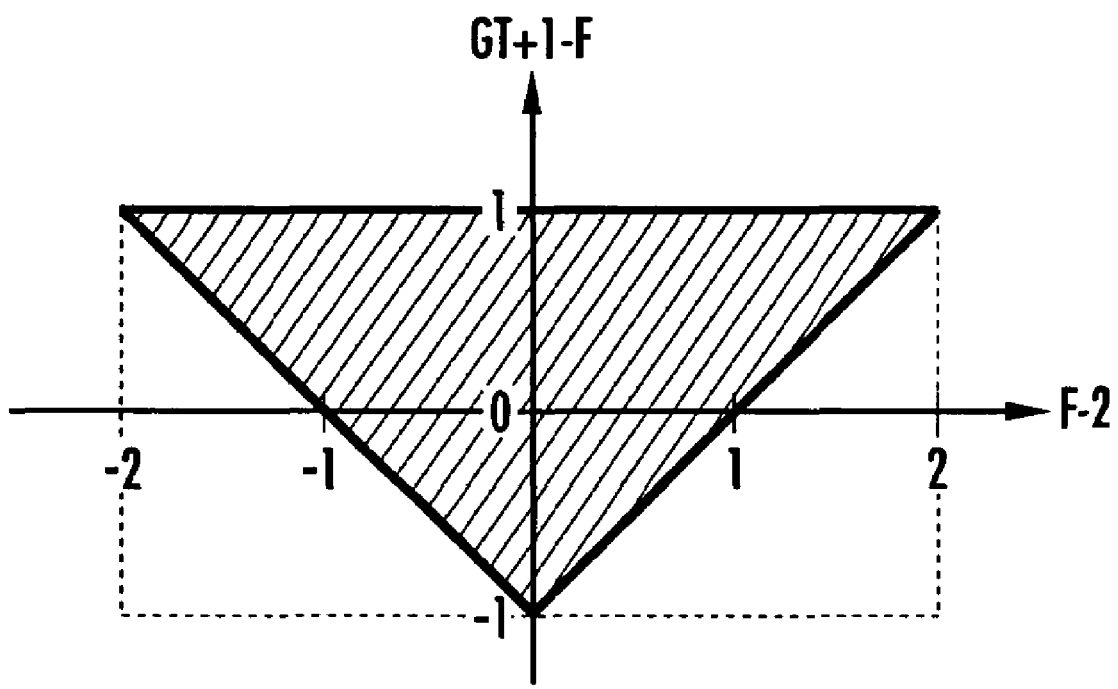
FIG. 6 is a graph showing the setting conditions of the reaching rule gain and adapting rule gain.
Figure 7:
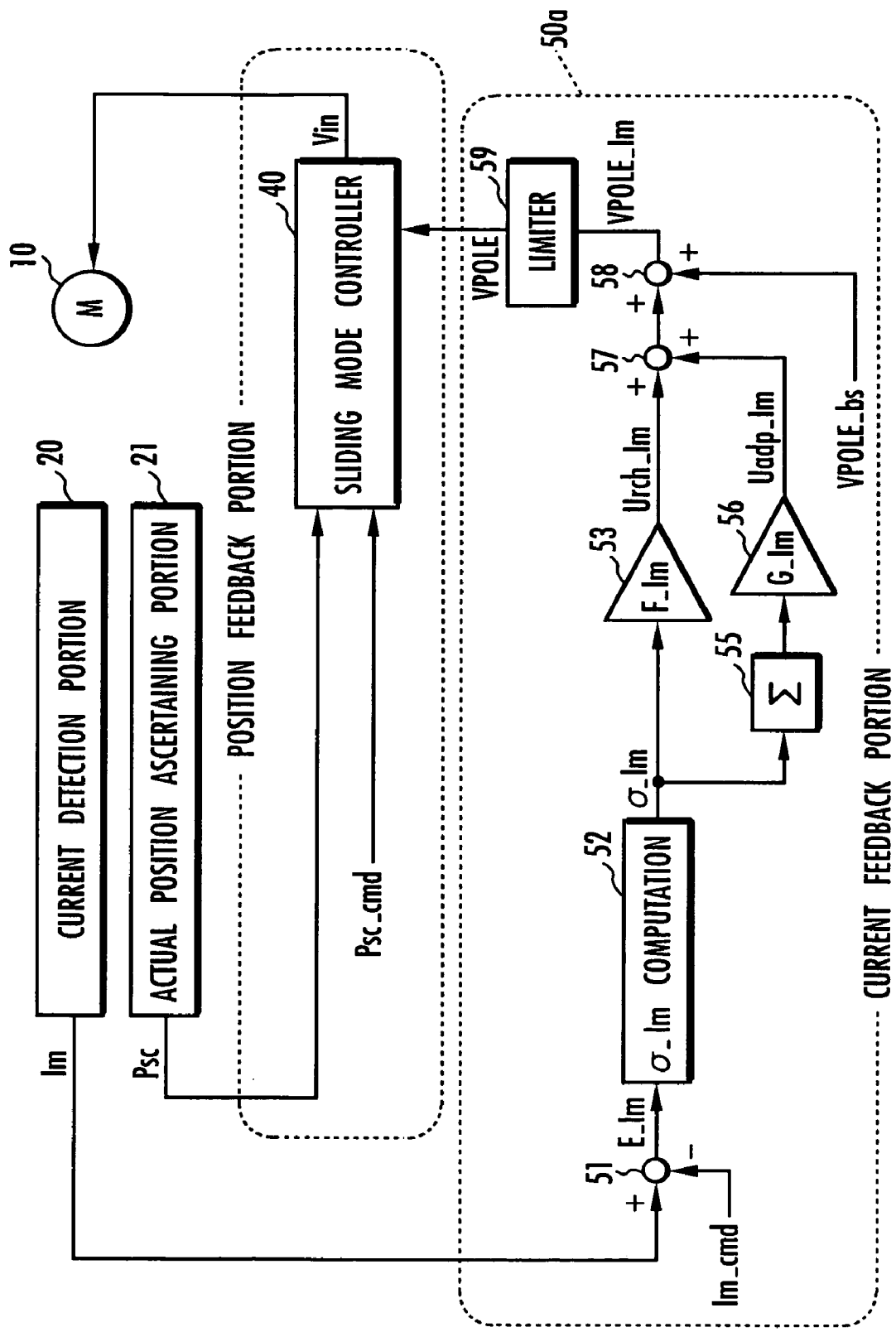
FIG. 7 is a control block diagram of a control apparatus to which current feedback processing is added.
Figure 8:
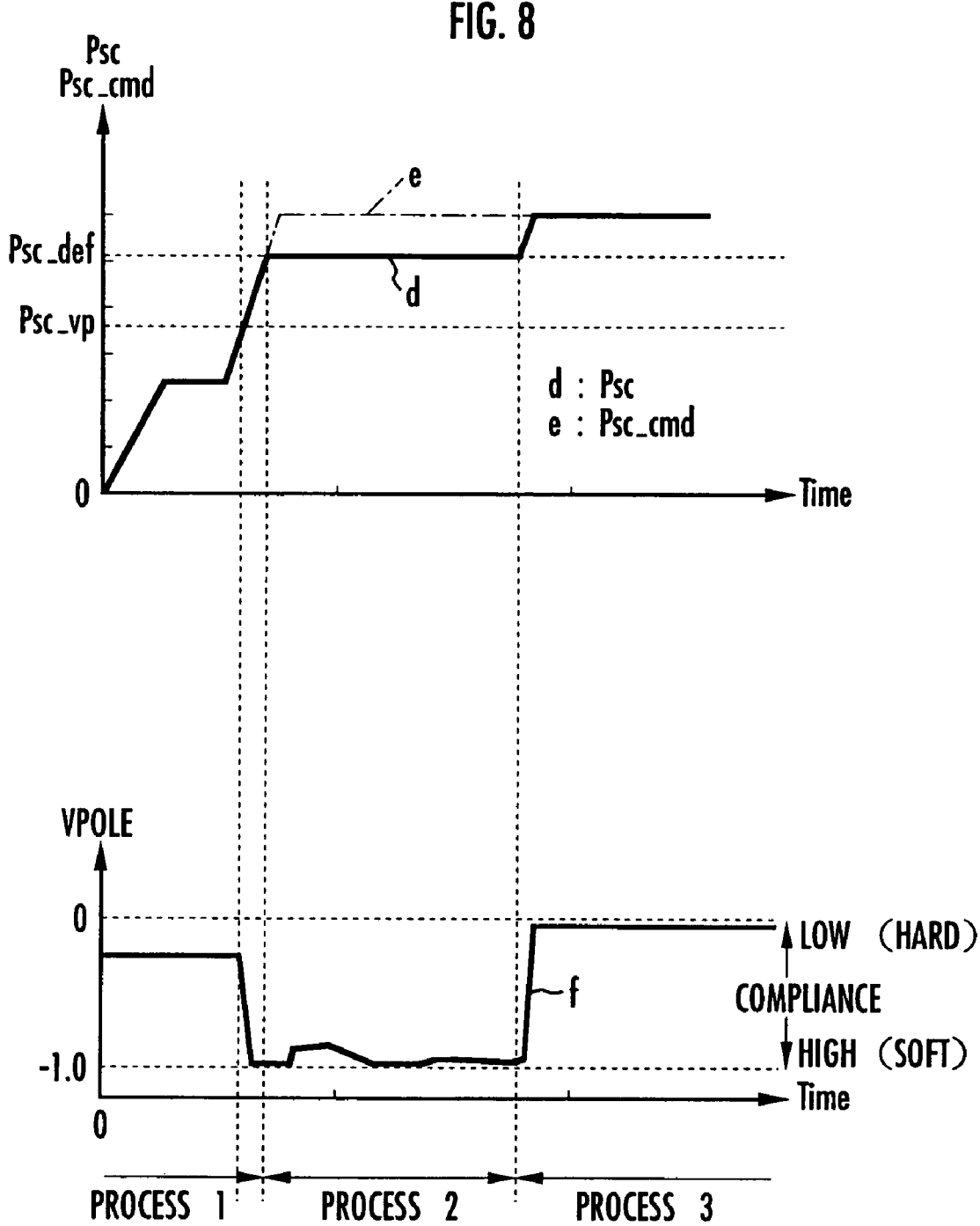
FIG. 8 is a graph showing the timing for switching between control processes.
Figure 9:
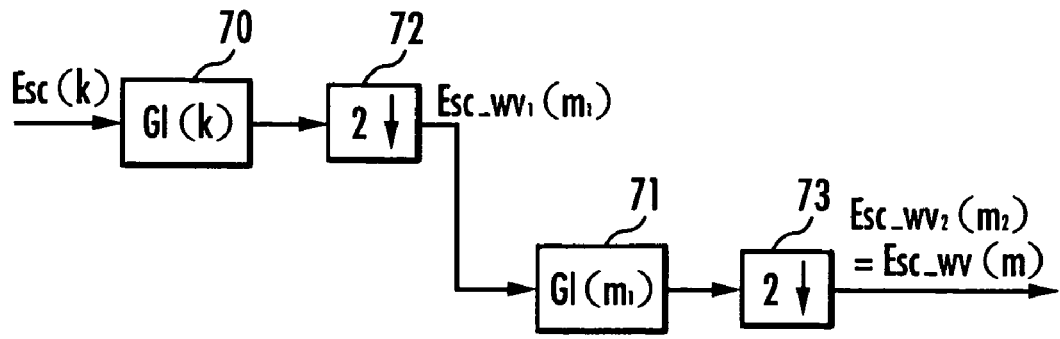
FIG. 9 is a drawing of the configuration of a wavelet transform filter.
Figure 9:
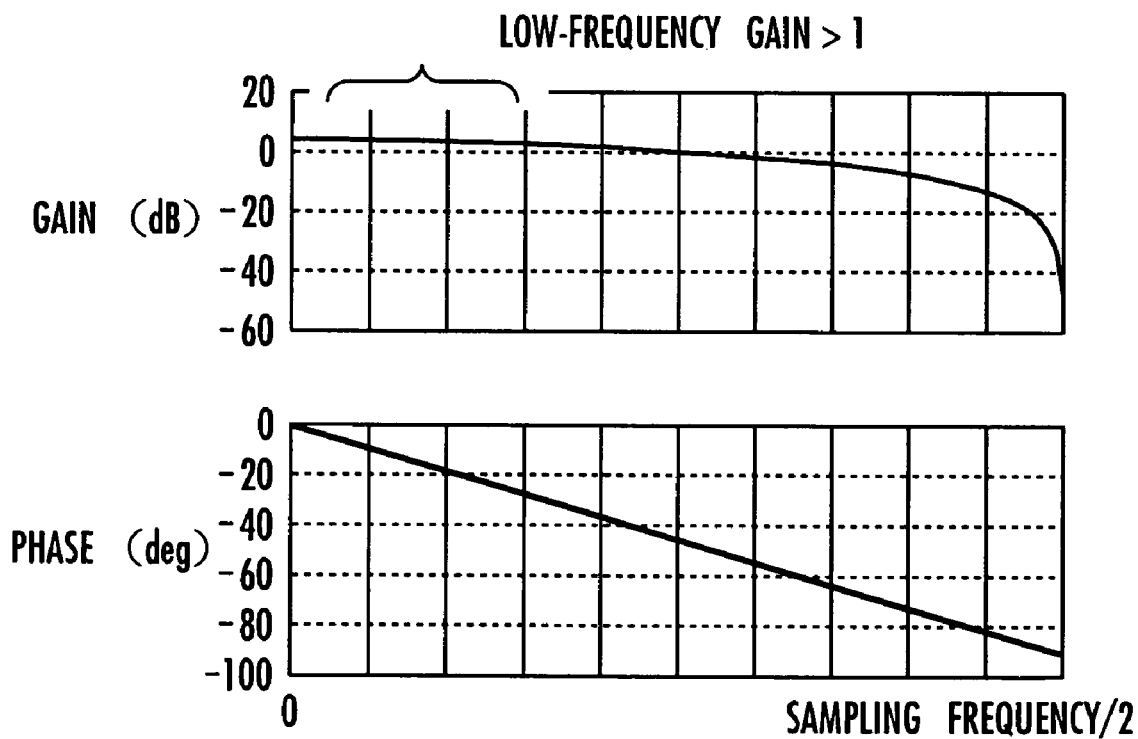
Figure 10:
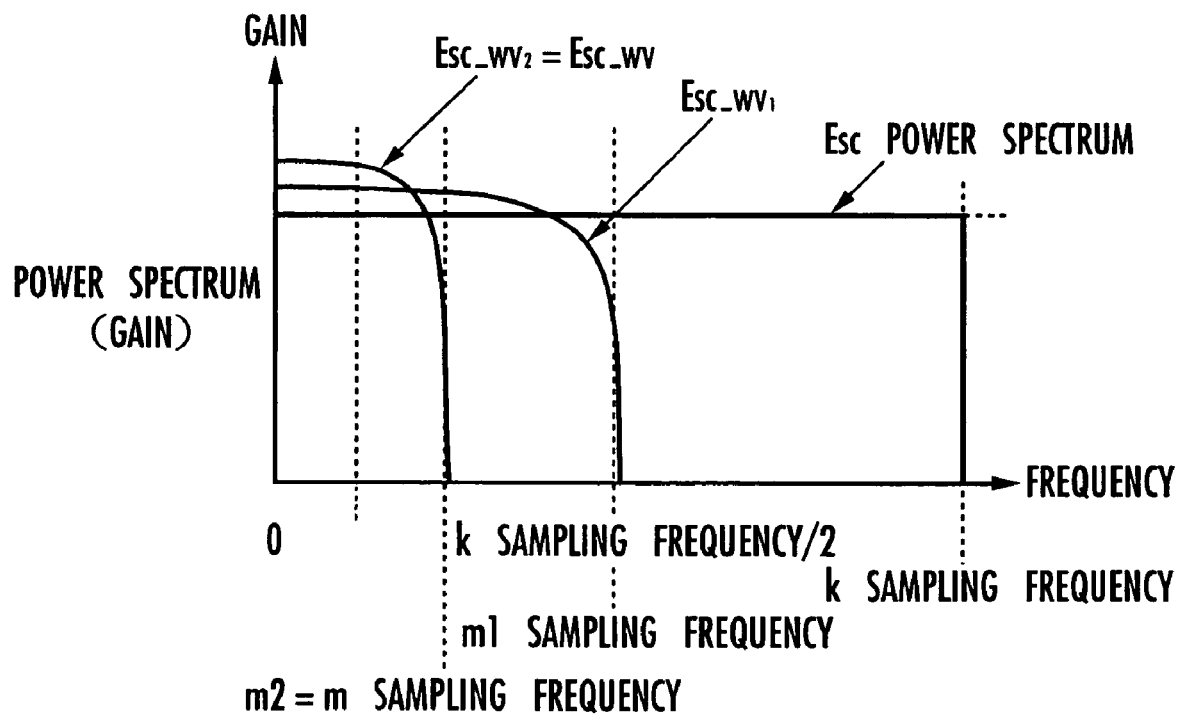
FIG. 10 is a drawing explaining decimation processing in a wavelet transform filter.
Figure 11:
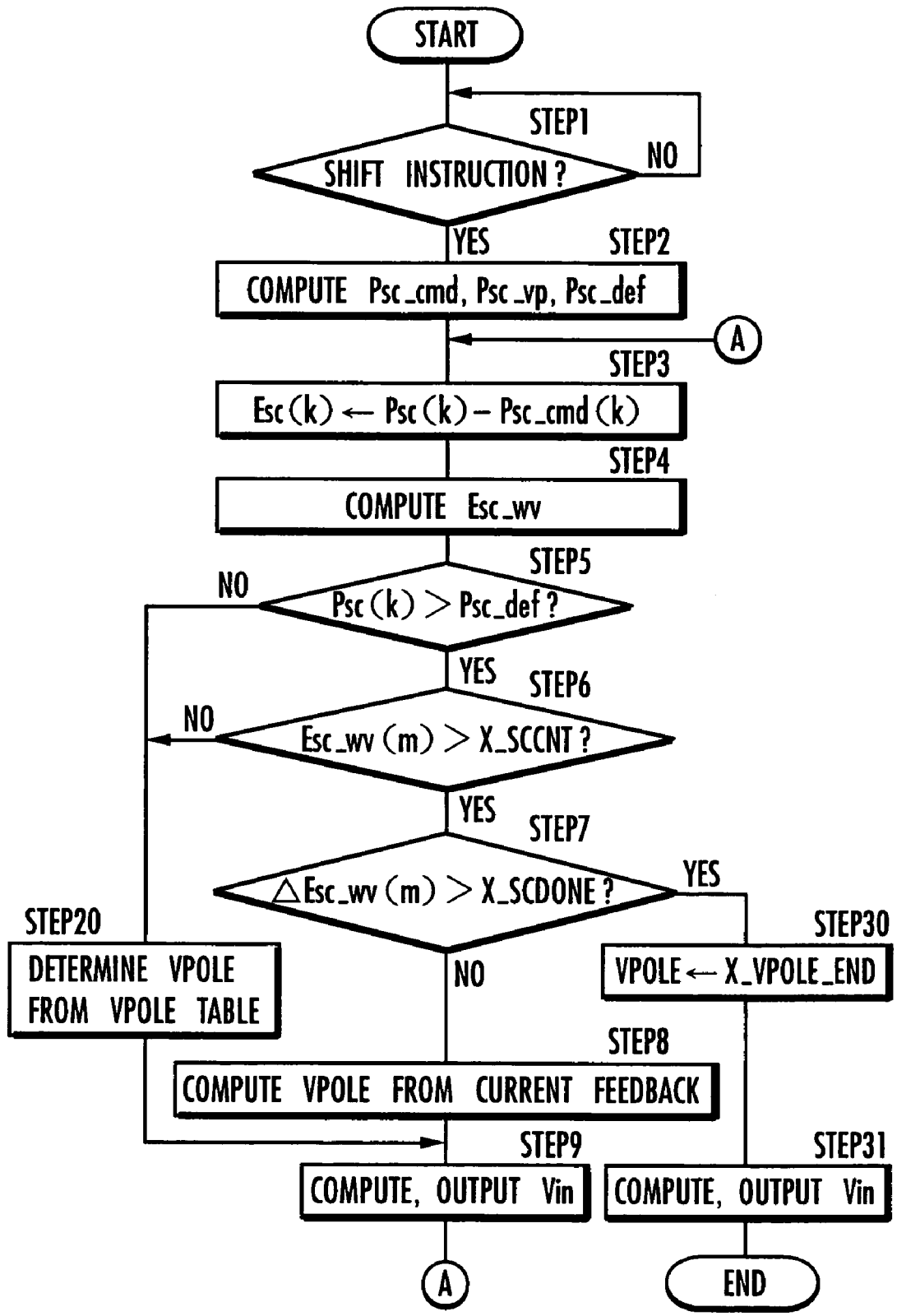
FIG. 11 is a flowchart of the action of a control apparatus.
Figure 12:
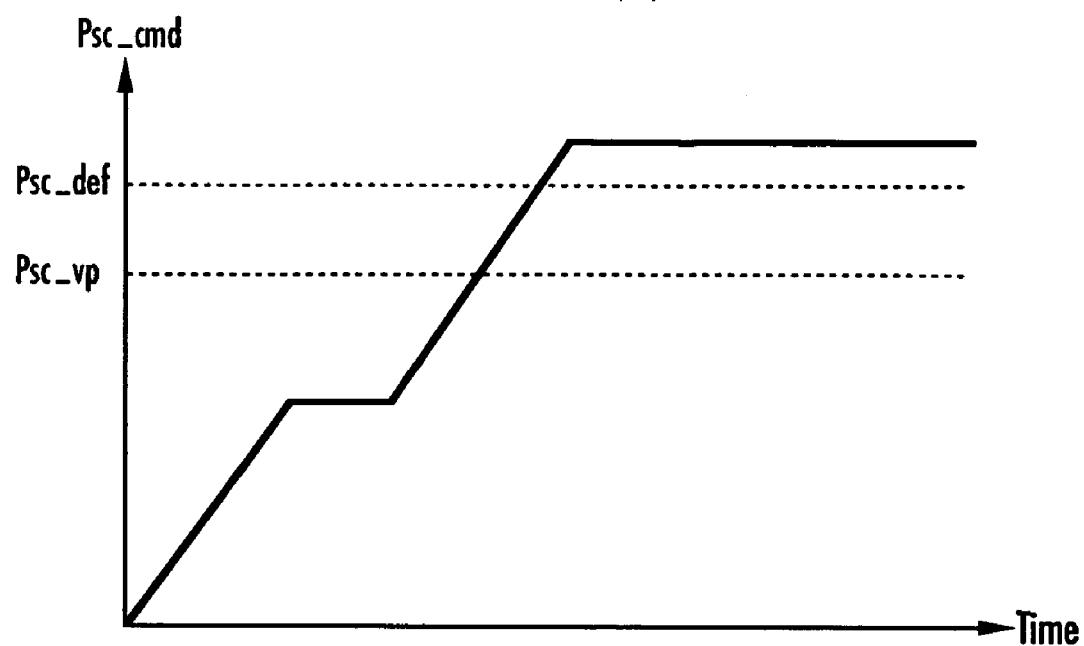
FIG. 12 shows a settings table of target positions and compliance parameters.
Figure 12:
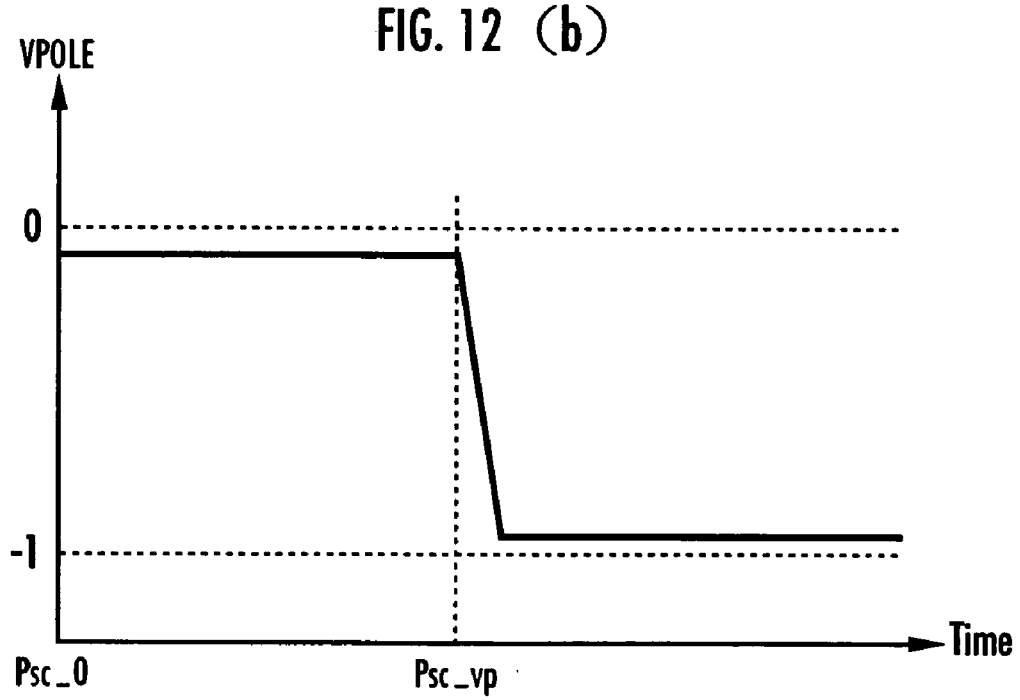
Figure 13:
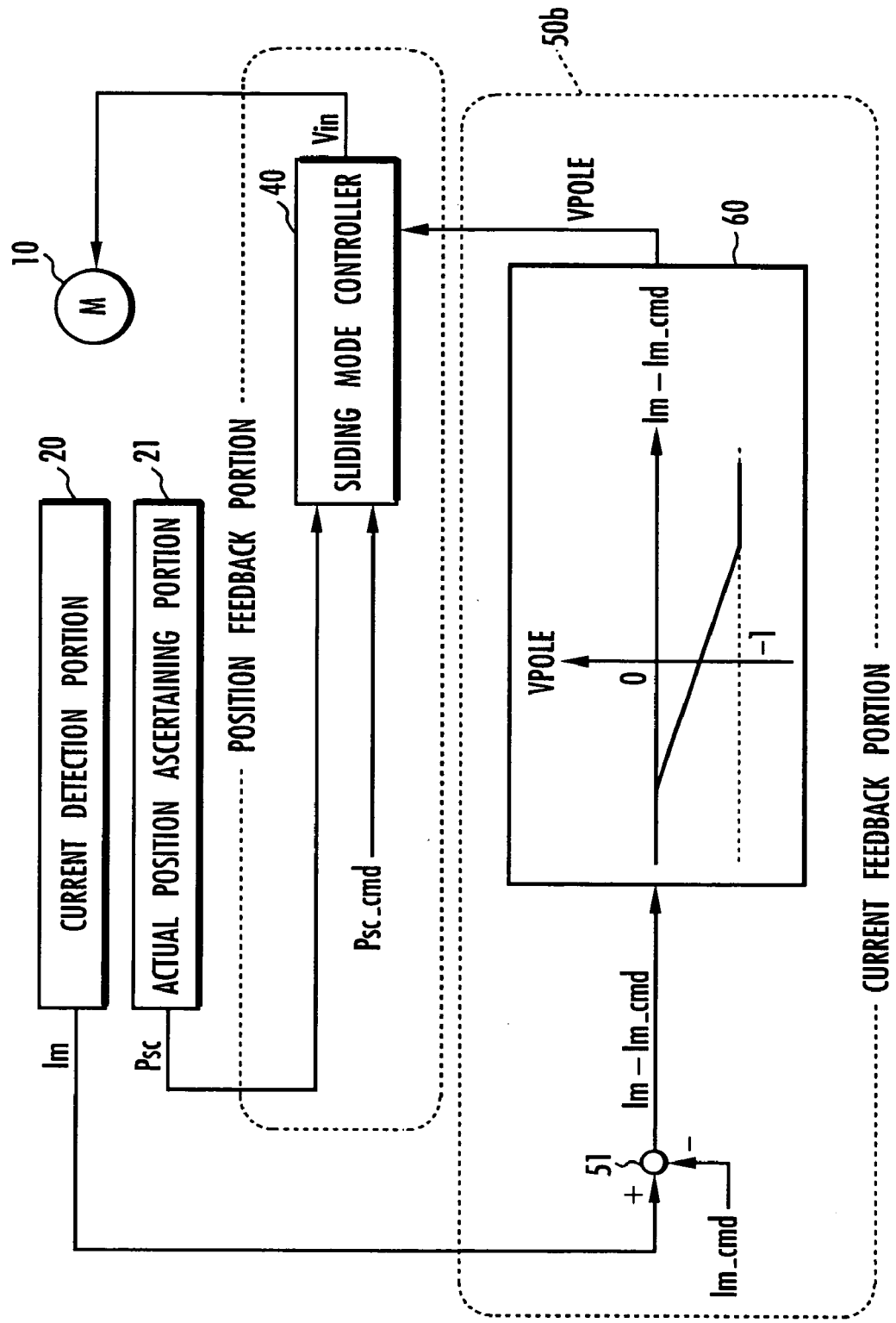
FIG. 13 is a control block diagram of another example of a control apparatus to which current feedback processing is added.
Figure 14:
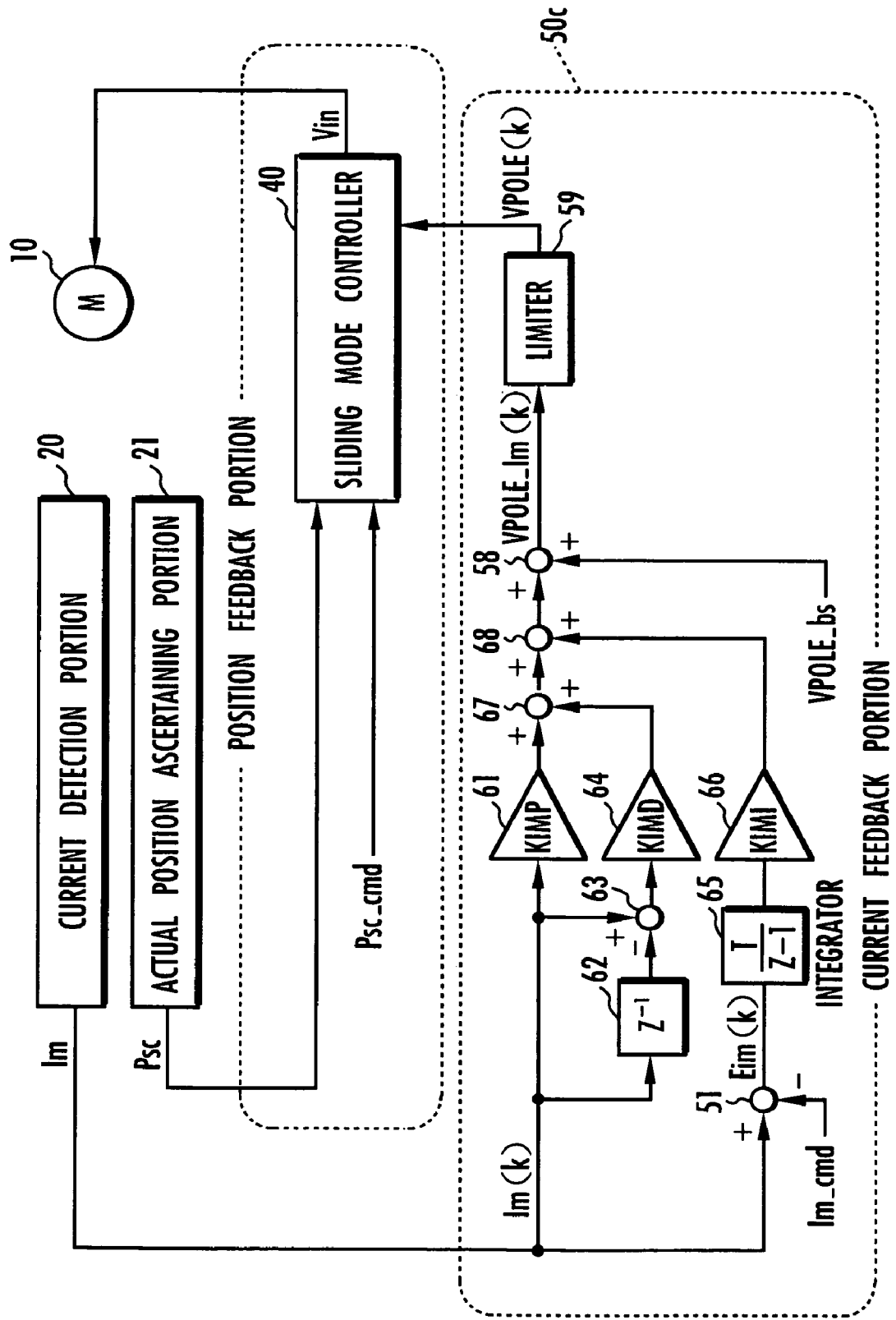
FIG. 14 is a control block diagram of another example of a control apparatus to which current feedback processing is added.
Figure 15:
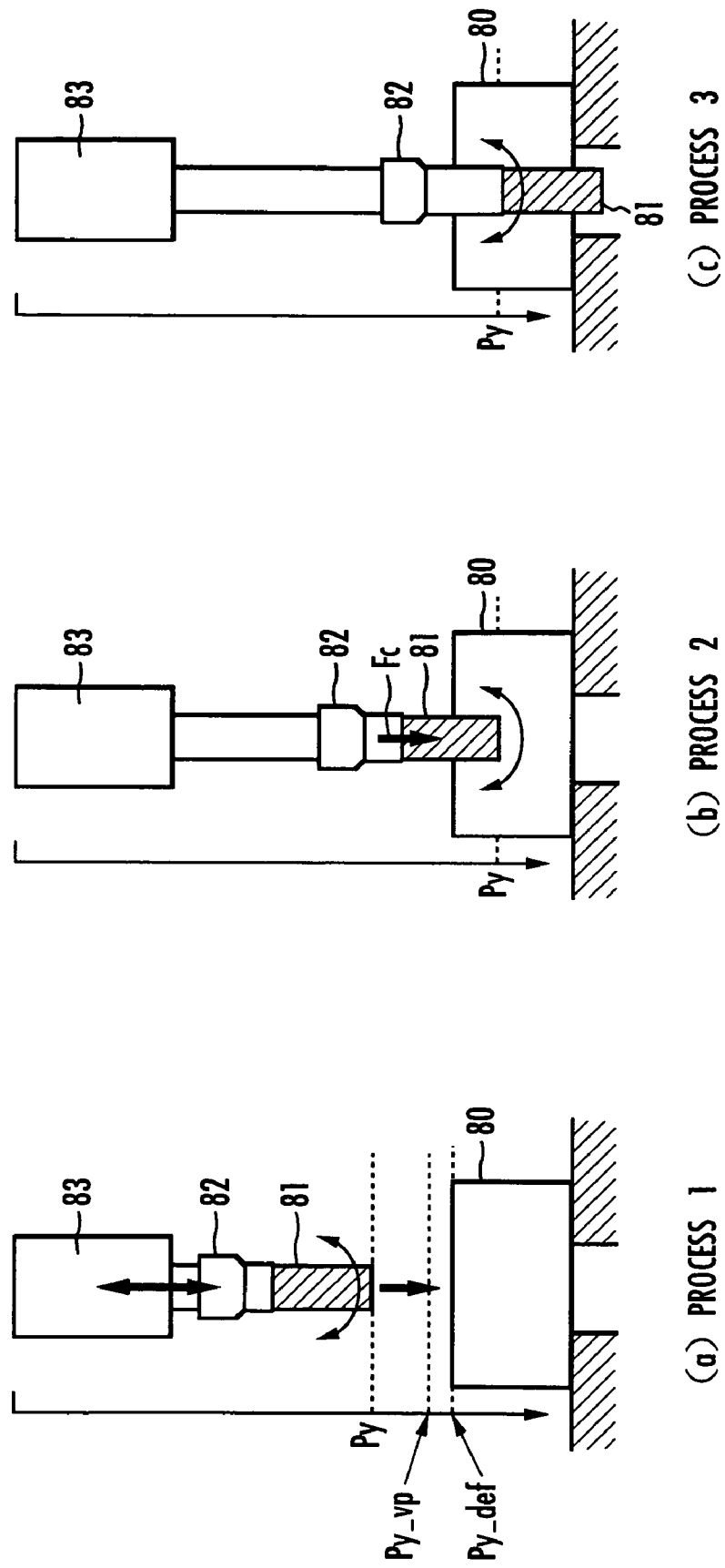
FIG. 15 shows a process of hole opening by a machine tool.
Figure 16:
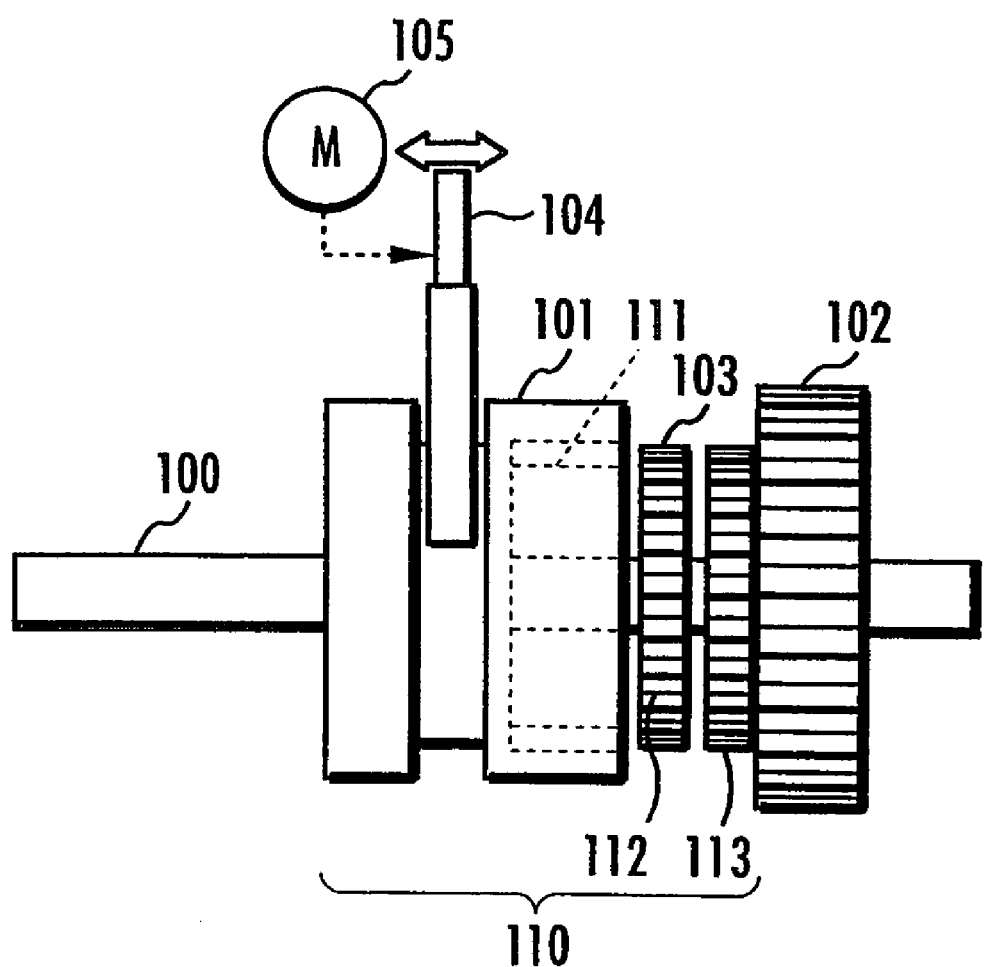
FIG. 16 is a drawing of the configuration of a conventional synchronizing mechanism.

Aspects of this invention are explained referring to FIG. 1 through FIG. 15. FIG. 1 is a drawing of the configuration of a synchronizing mechanism and control apparatus thereof, FIG. 2 is a drawing explaining the modeling of the synchronizing mechanism shown in FIG. 1, FIG. 3 is a control block diagram of the control apparatus shown in FIG. 1, FIG. 4 is a graph showing the operation of the sliding mode controller shown in FIG. 3, FIG. 5 is a graph showing the effect of modification of the compliance parameter, FIG. 6 is a graph showing the setting conditions of the reaching rule gain and adapting rule gain, FIG. 7 is a control block diagram of a control apparatus to which current feedback processing is added, FIG. 8 is a graph showing the timing for switching between control processes, FIG. 9 is a drawing of the configuration of a wavelet transform filter, FIG. 10 is a drawing explaining decimation processing in a wavelet transform filter, FIG. 11 is a flowchart of the action of a control apparatus, FIG. 12 shows a settings table of target positions and compliance parameters, FIG. 13 is a control block diagram of another example of a control apparatus to which current feedback processing is added, FIG. 14 is a control block diagram of another example of a control apparatus to which current feedback processing is added, and FIG. 15 shows a process of hole opening by a machine tool.

Referring to FIG. 1, the control apparatus 1 (equivalent to an actuator control apparatus of this invention) controls the action of a synchronizing mechanism 2 (equivalent to a contact mechanism of this invention), provided in an automobile transmission, and is an electronic unit comprising a microcomputer and memory.

The synchronizing mechanism 2 comprises a coupling sleeve 6 (equivalent to the moveable body, contact body, and first engaging member of this invention) which rotates integrally with an input shaft 5 linked to an engine or electric motor; a synchronized gear 7 (equivalent to the second engaging member of this invention), connected to an output shaft (not shown) connected to a driving wheel (not shown) and provided on the input shaft 5, freely rotatably and unable to move in the shaft direction; a synchronizer gear 8 (equivalent to the connected body and the synchronizing member of this invention), provided on the input shaft 5 between the coupling sleeve 6 and synchronized gear 7, freely rotatably and also free to move in the shaft direction of the input shaft 5; and a shift fork 11, connected to the electric motor 10 (equivalent to the actuator of this invention) and to the coupling sleeve 6.

The shift fork 11 moves the coupling sleeve 6 in the shaft direction of the input shaft 5 according to rotation of the electric motor 10. The coupling sleeve 6 has a hollow construction, and a spline 12 is formed on the inner surface of the hollow portion. Also, a spline 13 capable of engaging with the spline 12 of the coupling sleeve 6 is formed on the outer surface of the synchronizer ring 8, and a spline 14 capable of engaging with the spline 12 of the coupling sleeve 6 is also formed on the outer surface of the synchronized gear 7 in the portion opposing the synchronizer gear 8.

When the coupling sleeve 6, which rotates together with the input shaft 5, is moved in the direction of the synchronized gear 7 by the shift fork 11, a state is entered in which the coupling sleeve 6 and the synchronizer ring 8 make contact and the synchronizer ring 8 and synchronized gear 7 also make contact. At this time, due to the friction force arising from contact, the rates of rotation of the coupling sleeve 6 and synchronized gear 7 are synchronized through the synchronizer ring 8.

In this way, in the state in which the rates of rotation of the coupling sleeve 6 and synchronized gear 7 are synchronized, when the coupling sleeve 6 is moved further in the direction of the synchronized gear 7, the spline 12 formed in the coupling sleeve 6 passes the spline 13 formed in the synchronizer ring 8 and engages with the spline 14 formed in the synchronized gear 7. By this means, a state is entered in which power is transmitted between the input shaft 5 and the output shaft.

The electric motor 10 operates through the application of a voltage (Vin, equivalent to the operation amount and the first operation amount in this invention) output from the control apparatus 1, and a rotation rate detection signal (Es) for the electric motor 10 is input from the rotation rate sensor 15 to the control apparatus 1.

The control apparatus 1 comprises a current detection portion 20, which detects the current flowing in the armature of the electric motor 10 (Im, hereafter called the armature current, equivalent to the second state value of this invention); actual position ascertaining portion 21 (equivalent to the first state value ascertaining means and actual position ascertaining means of this invention), which ascertains the actual position of the coupling sleeve 6 (Psc, equivalent to the first state value of this invention) based on the rotation rate detection signal (Es) from the rotation rate sensor 15 and the like; the target position setting portion 22 (equivalent to the target position setting means of this invention), which sets the target position of the coupling sleeve 6 (Psc_cmd, equivalent to the first target value of this invention) in the process of moving and engaging the coupling sleeve 6 with the synchronized gear 7 through the synchronizer ring 8; the target current setting portion 23, which sets the target current (Im_cmd, equivalent to the second target value of this invention) which is the target value for the current flowing in the electric motor 10; and the voltage determining portion 24 (equivalent to the operation amount determining means of this invention), which determines the voltage applied to the electric motor 10 (Vin, equivalent to the first operation amount of this invention).

After the coupling sleeve 6 begins motion, the actual position ascertaining portion 21 synchronizes the rates of rotation of the coupling sleeve 6 and synchronized gear 7 through contact with the synchronizer ring 8, and the behavior until engaging of the coupling sleeve 6 with the synchronized gear 7 through the synchronizer ring 8 is regarded as a collision of an inertial system object and an elastic system object to perform modeling; based on this model, the actual position (Psc) of the coupling sleeve 6 is ascertained.

FIG. 2 shows this model; the actual position ascertaining portion 21 regards the coupling sleeve 6, including the electric motor 10 and shift fork 11 (see FIG. 1), as an inertial system object 30 with equivalent inertia Jm, and the synchronizer ring 8 (see FIG. 1) as an elastic system object 31 with equivalent inertia Ms and spring constant Ks, to ascertain the position of the coupling sleeve 6. In FIG. 2, Tm is the output torque of the electric motor 10, and Psc_def is the standby position of the synchronizer ring 8 (see FIG. 1). Below, procedures for calculation of model equations representing the model shown in FIG. 2 are explained.

First, derivation of the model equation for the continuous-time system prior to contact of the inertial system object 30 with the elastic system object 31 (before the coupling sleeve 6 makes contact with the synchronizer ring 8) is explained.

The equation of motion of the electric motor 10 shown in FIG. 1 is given by equation (1) below.

$$Jm \cdot \dot{\omega} = Tm \qquad (1)$$

Here Jm is the equivalent inertia of the coupling sleeve 6, including the electric motor 10 and shift fork 11, ω is the rate of rotation of the electric motor 10 (detected by the rotation rate sensor 15), and Tm is the output torque of the electric motor 10.

The relation between the output torque (Tm) of the electric motor 10 and the armature current (Im) in the electric motor 10 is given by the following equation (2), and the relation between the voltage appearing in the armature of the electric motor 10 (Vm, hereafter called the armature voltage) and the electrical resistance of the armature (Rm, hereafter called the armature resistance) is given by the following equation (3).

$$Tm = Km \cdot Im \quad (2)$$

Here Im is the armature current of the electric motor 10, and Km is a torque conversion coefficient.

$$Vm = Rm \cdot Im \quad (3)$$

Here Vm is the armature voltage of the electric motor 10, and Rm is the armature resistance of the electric motor 10.

Hence applying the above equations (2) and (3) to the above equation (1), the following equation (4) is obtained.

$$Vm = \frac{Jm \cdot Rm}{Km} \dot{\omega} \quad (4)$$

Further, the relation between the voltage (Vin) applied to the electric motor 10 and the back electromotive force occurring in the electric motor 10 is given by the following equation (5).

$$Vin = Km' \cdot \omega + Vm \quad (5)$$

Here Vin is the voltage applied to the electric motor 10, and Km' is the back electromotive force constant.

Applying the above equation (5) to the above equation (4), the following equation (6) is obtained.

$$Vin = Km' \cdot \omega + \frac{Jm \cdot Rm}{Km} \dot{\omega} \quad (6)$$

The relations of the rate of rotation (ω) and rotation angle (θ) of the electric motor 10 to the position (Psc) of the inertial system object 30 are represented by the following equations (7) and (8).

$$\theta = \int_0^t \omega \, dt \quad (7)$$

$$Psc = Rsc \cdot \theta \quad (8)$$

Here ω is the rate of rotation of the electric motor 10, θ is the rotation angle of the electric motor 10, t is the time elapsed from the start of operation of the electric motor 10, and Rsc is the lever ratio and gear ratio between the rotation angle (θ) of the electric motor 10 and the inertial system object 30.

Hence from the above equations (7) and (8), the following equations (9), (10) and (11) can be obtained.

$$Psc = \int_0^t Rsc \cdot \omega \, dt \quad (9)$$

$$\dot{P}sc = \dot{R}sc \cdot \theta + Rsc \cdot \dot{\theta} \quad (10)$$
$$= Rsc \cdot \dot{\theta} \quad \text{※} \dot{R}sc = 0$$
$$= Rsc \cdot \omega$$

$$\ddot{P}sc = \dot{R}sc \cdot \omega + Rsc \cdot \dot{\omega} \quad (11)$$
$$= Rsc \cdot \dot{\omega}$$

Substituting the above equations (9), (10) and (11) into equation (6) above, the following equation (12) is obtained.

$$\ddot{P}sc = \frac{-Km' Km}{Jm Rm} \dot{P}sc + \frac{Km \cdot Rsc}{Jm \cdot Rm} Vin \quad (12)$$

As elements necessary for control of the synchronizing mechanism 2, in addition to the position (Psc) of the coupling sleeve 6, the armature current (Im, equivalent to the second state value of this invention) is used to detect the load on the electric motor 10. From the above equations (4) and (11), the following equation (13), which is a model equation for the armature current (Im), is obtained.

$$Im = \frac{Vm}{Rm} = \frac{Jm}{Km} \dot{\omega} = \frac{Jm}{Km \cdot Rsc} \ddot{P}sc \quad (13)$$

Here Im is the armature current of the electric motor 10.

From the above, a model of an one-input two-output system which takes the voltage (Vin) applied to the electric motor 10 as an input, and takes the actual position (Psc) of the coupling sleeve 6 and the armature current (Im) of the electric motor 10 as outputs, is expressed by the above equations (12) and (13).

Next, derivation of model equations for the continuous-time system when the inertial system object 30 makes contact with the elastic system object 31 and receives the reaction force from the elastic system object 31 (when the coupling sleeve 6 makes contact with the synchronizer ring 8 and receives the reaction force from the synchronizer ring 8) is explained.

The equation of motion of the elastic system object 31 is given by the following equation (14).

$$Ms \, \ddot{P}sc = -Ksc(Psc - Psc\_def) + Fsc \quad (14)$$

Here Ms is the equivalent inertia of the elastic system object 31, Psc_def is the standby position of the elastic system object 31, Ksc is the spring constant of the elastic system object 31, and Fsc is the force received by the elastic system object 31 from the inertial system object 30 (the reaction force applied by the elastic system object 31 to the inertial system object 30).

The above equation (14) can be rearranged in terms of the reaction force (Fsc), to obtain the form of the following equation (15).

$$Fsc = Ms \cdot \ddot{P}sc + Ksc(Psc - Psc\_def) \quad (15)$$

Here the reaction force (Fsc) is the reaction force applied by the elastic system object 31 to the inertial system object 30; the equation of motion of the inertial system object 30 when this reaction force (Fsc) is applied is given by the following equation (16).

$$Jm \cdot \dot{\omega} = Tm - Rsc \cdot Fsc \quad (16)$$
$$= Km \cdot Im - Rsc \cdot Fsc$$
$$= Km \cdot Vm / Rm - Rsc \cdot Fsc$$

This equation (16) can be modified to obtain the form of equation (17) below; when the back electromotive force of the electric motor 10 is taken into account, the relation between the voltage (Vin) applied to the electric motor 10 and the armature voltage (Vm) is as given by equation (18).

$$Vm = \frac{Jm \cdot Rm}{Km} \dot{\omega} + \frac{Rsc \cdot Rm}{Km} Fsc \quad (17)$$

$$Vin = Km' \cdot \omega + Vm \quad (18)$$
$$= Km' \cdot \omega + \frac{Jm \cdot Rm}{Km} \dot{\omega} + \frac{Rsc \cdot Rm}{Km} Fsc$$

On substituting the above equations (10) and (11) into equation (18), the following equation (19) is obtained; and equation (19) can be rearranged to obtain equation (20).

$$Vin = Km' \cdot \dot{P}sc / Rsc + \frac{Jm \cdot Rm}{Km} \ddot{P}sc / Rsc + \frac{Rsc \cdot Rm}{Km} Fsc \quad (19)$$

$$\ddot{P}sc = \frac{-Km \cdot Km'}{Jm \cdot Rm} \dot{P}sc + \frac{Km \cdot Rsc}{Jm \cdot Rm} Vin - \frac{Rsc^2 \cdot Rm}{Jm \cdot Rm} Fsc \quad (20)$$

As an expression of the armature current (Im) of the electric motor 10, by substituting the above equation (11) into the above equation (16), the following equation (21) is obtained.

$$Im = \frac{Jm}{Km \cdot Rsc} \ddot{P}sc + \frac{Rsc}{Km} Fsc \quad (21)$$

From the above, a model which takes into account the reaction force from the elastic system object 31 is expressed by the above equations (20) and (21).

Next, based on the model equations for a continuous-time system given by the above equations (20) and (21), the model equations for a discrete-time system are derived.

First, if the state variables (x1, x2) for the continuous-time system model are set as in the following equation (22), then from the above equation (20), the continuous-time system mode is expressed by the following equation (23).

$$\begin{cases} x1 = Psc \\ x2 = \frac{dx_1}{dt} = \dot{P}sc, \; \frac{dx_2}{dt} = \ddot{P}sc \end{cases} \quad (22)$$

$$\begin{cases} \frac{dx_1}{dt} = x2 \\ \frac{dx_2}{dt} = \frac{-Km \cdot Km'}{Jm \cdot Rm} x2 + \frac{Km \cdot Rsc}{Jm \cdot Rm} Vin - \frac{Rsc^2}{Jm} Fsc \end{cases} \quad (23)$$

Here, if the sampling period of the control apparatus 1 is T, then the Euler approximation may be used to express the above equation (23) in the form of the following equation (24); and modifying equation (24) results in equations (25) and (26).

$$\begin{cases} \frac{x_1(t) - x_1(t-T)}{T} = x2(t) \\ \frac{x_2(t) - x_1(t-T)}{T} = \frac{-Km \cdot Km'}{Jm \cdot Rm} x2(t-T) + \\ \quad \frac{Km \cdot Rsc}{Jm \cdot Rm} Vin(t-T) - \frac{Rsc^2}{Jm} Fsc \end{cases} \quad (24)$$

Here $t$ is the sampling time, and $T$ is the sampling period.

$$x_1(t) = x_1(t-T) + T \cdot x_2(t) \quad (25)$$

$$x_2(t) = \left(1 - \frac{-Km \cdot Km'}{Jm \cdot Rm} T\right) x2(t-T) + \quad (26)$$
$$\frac{Km \cdot Rsc}{Jm \cdot Rm} T \cdot Vin(t-T) - \frac{Rsc^2}{Jm} T \cdot Fsc$$

Further, from the Euler approximation, x2(t−T) in the above equation (26) can be expressed by the following equation (27).

$$x2(t - 2T) = \frac{x_1(t-T) - x_1(t-2T)}{T} \quad (27)$$

Substituting the above equations (26) and (27) into equation (25) and rearranging, the following equation (28) is obtained.

$$x_1(t) = \left(2 - \frac{Km \cdot Km'}{Jm \cdot Rm} T\right) x1(t-T) - \left(1 - \frac{Km \cdot Km'}{Jm \cdot Rm} T\right) x1(t-2T) + \quad (28)$$
$$\frac{Km \cdot Rsc}{Jm \cdot Rm} T^2 \cdot Vin(t-T) - \frac{Rsc^2}{Jm} T^2 \cdot Fsc$$

The above equation (28) can be rearranged with k=kT in the form of the following equation (29), so that equation (30) is obtained.

$$x_1(k) = \left(2 - \frac{Km \cdot Km'}{Jm \cdot Rm} T\right) x1(k-1) - \left(1 - \frac{Km \cdot Km'}{Jm \cdot Rm} T\right) x1(k-2) + \quad (29)$$
$$\frac{Km \cdot Rsc}{Jm \cdot Rm} T^2 \cdot Vin(k-1) - \frac{Rsc^2}{Jm} T^2 \cdot Fsc$$

$$x_1(k+1) = \left(2 - \frac{Km \cdot Km'}{Jm \cdot Rm} T\right) x1(k) - \left(1 - \frac{Km \cdot Km'}{Jm \cdot Rm} T\right) x1(k-1) + \quad (30)$$
$$\frac{Km \cdot Rsc}{Jm \cdot Rm} T^2 \cdot Vin(k) - \frac{Rsc^2}{Jm} T^2 \cdot Fsc$$

Replacing coefficients in the above equation (30) as indicated in the following equation (31), it is possible to express equation (30) in the form of the following equation (32).

$$\begin{cases} x1 = Psc \\ a1 = 2 - \dfrac{Km \cdot Km'}{Jm \cdot Rm}T, \ a2 = -1 + \dfrac{Km \cdot Km'}{Jm \cdot Rm}T \\ b1 = \dfrac{Km \cdot Rsc}{Jm \cdot Rm}T^2 \\ d = \dfrac{Rsc^2}{Jm}T^2 \cdot Fsc \end{cases} \quad (31)$$

$$Psc(k+1) = a1 \cdot Psc(k) + a2 \cdot Psc(k-1) + b1 \cdot Vin(k) + d \quad (32)$$

Based on a model expressed by the following equation (33), which takes the disturbance term d in the discrete-time system model expressed by the above equation (32) to be 0, a control apparatus 1 can be designed with the configuration shown in FIG. 3. Below, the configuration of the control apparatus 1 shown in FIG. 3 is explained.

$$Psc(k+1) = a1 \cdot Psc(k) + a2 \cdot Psc(k-1) + b1 \cdot Vin(k) \quad (33)$$

First, in relation to the model represented by the above equation (33), a procedure is explained for designing a sliding mode controller 40 which realizes (1) prompt tracking of the actual position (Psc) of the inertial system object 30 to a target position (Psc_cmd), and (2) compliance properties (a rubber-like elasticity) during contact of the inertial system object 30 with the elastic system object 31.

The sliding mode controller 40 employs sliding mode control (equivalent to the first response specifying control of this invention), which is one example of response specifying control, to control the behavior of the inertial system object 30. The actual position (Psc) of the inertial system object 30 computed by the actual position ascertaining portion 21 based on the above equation (33), the target position (Psc_cmd) of the inertial system object 30 set by the target position setting portion 22, and a compliance parameter (VPOLE), described below, are input to the sliding mode controller 40.

Then, if the deviation (Esc) between the actual position (Psc) of the inertial system object 30 and the target position (Psc_cmd) is defined as in the following equation (34), then a switching function (σ, equivalent to the linear function and the first linear function of this invention) specifying the convergence behavior of the deviation (Esc) and the degree of influence on the deviation (Esc) of disturbances is defined by the following equation (35), given that there are two state variables for equation (34), Psc(k) and Psc(k−1).

$$Esc(k) = Psc(k) - Psc\_cmd(k) \quad (34)$$

$$\sigma(k) = Psc(k) + VPOLE \cdot Esc(k-1) \quad (35)$$

Here VPOLE is a compliance parameter (a switching function setting parameter).

The sliding mode controller 40 determines the control input such that this switching function (σ) satisfies σ(k)=0. This σ(k)=0 can be modified to the form of the following equation (36), using equation (35) above.

$$Esc(k) = -VPOLE \cdot Esc(k-1) \quad (36)$$

Here equation (36) describes a first-order lag system with no input, and so the sliding mode controller 40 executes control causing the response of the control system to converge on the first-order lag system of the above equation (36).

Hence as shown in (a) of FIG. 4, if a phase plane is set taking Esc(k) as the vertical axis and Esc(k−1) as the horizontal axis, then the above equation (36) is seen to represent a linear function in this phase plane. Because the above equation (36) represents a first-order lag system with no inputs, if the compliance parameter (VPOL, equivalent to the computation coefficient in this invention) is set within the range of the following equation (37), and the first-order lag system is stabilized, then a system results in which, with the passage of time (k→∞), the deviation (Esc) always converges on 0.

$$-1 < VPOLE < 1 \quad (37)$$

From this, in the phase plane shown in (a) of FIG. 4, when the state amount of the deviation (Esc(k) and Esc(k−1), equivalent to the first state amount in this invention) lie upon the switching function (σ(k)=0, equivalent to the first switching function in this invention), the state amount is constrained to a first-order lag system with no inputs, and so automatically converges on the origin of the phase plane {(Esc(k), Esc(k−1))=(0,0)} with the passage of time.

The sliding mode controller 40 utilizes this behavior of the deviation state amount (Esc(k), Esc(k−1)) on the switching function to determine the control input (Vin) such that σ=0 in the above equation (35), as shown in (a) of FIG. 4. By this means, the sliding mode controller 40 causes the state amount to be constrained to the switching function (σ(k)=0) and to converge on the origin of the phase plane without being influenced by disturbances or model error.

The behavior until the deviation state amount approaches the switching function (the process from P1 to P2 in the figure) is called the reaching mode, and the behavior in which the state amount on the switching function converges automatically in the direction of the origin (the process from P2 to P0 in the figure) is called the sliding mode.

If the compliance parameter (VPOLE) in the above equation (36) is set to positive (0<VPOLE<1), then the first-order lag system described by equation (36) is a stable vibrating system, which is undesirable in control causing the deviation (Esc) to converge. Hence by setting the compliance parameter (VPOLE) in the range −1 to 0 (−1<VPOLE<0), the convergence response of the deviation (Esc) is set as shown in (b) of FIG. 4. In (b) of FIG. 4, a, b and c denote changes in the deviation (Esc) when the compliance parameter (VPOLE) is set to −1, −0.8, and −0.5 respectively; in this case, if VPOLE is set to −1, the deviation (Esc) is a constant value and does not converge on 0.

Next, the dynamic characteristic of the above equation (36), that is, the response specifying characteristic of the sliding mode controller 40 is explained. FIG. 5 is a graph showing the response of the control system when the compliance parameter (VPOLE) is set to −0.5, −0.8, −0.99, and −1.0, and while in the state σ=0 and Esc=0, a step disturbance D is applied; the vertical axes indicate, from the top, the deviation (Esc), switching function (σ), and disturbance (D), and the horizontal axis denotes time (k).

As is clear from FIG. 5, the smaller the absolute value of the compliance parameter (VPOLE), the smaller is the effect of a disturbance (D) on the deviation (Esc). Conversely, the more closely the absolute value of the compliance parameter (VPOLE) approaches to 1, the larger is the deviation (Esc) tolerated by the sliding mode controller. Here, because the behavior of the switching function value (σ) is the same regardless of the value of the compliance parameter (VPOLE), it is seen that the tolerance with respect to a disturbance (D) (the ability to suppress a disturbance) can be specified through the compliance parameter (VPOLE).

When the inertial system object 30 makes contact with the elastic system object 31, shown in FIG. 2, the inertial system object 30 must be pressed against the elastic system object 31, while avoiding the occurrence of a state in which (1) the inertial system object 30 rebounds from the elastic system object 31, (2) the inertial system object is pressed by an excessive collision force against the elastic system object.

Hence focusing on the above characteristic, it is effective, when the inertial system object 30 makes contact with the elastic system object 31, to set the compliance parameter (VPOLE) to the vicinity of −1 and increasing the amount of tolerance of the deviation (Esc) for disturbances (reducing the ability to suppress disturbances), and by this means to cause compliance properties through the action of the electric motor 10 when the inertial system object 30 and the elastic system object 31 make contact.

By this means, there are the advantageous results that the occurrence of a large shock upon contact of the inertial system object 30 and the elastic system object 31 can be suppressed, and the inertial system object 30 can be pressed against the elastic system object 31 without applying excessive force to the elastic system model 31.

Considering these advantageous results as applied to the actual synchronizing mechanism 1 shown in FIG. 1, the shock occurring when the coupling sleeve 6 makes contact with the synchronizer ring 8 can be alleviated. Further, the coupling sleeve 6 can be pressed against the synchronizer ring 8 without applying excessive force to the synchronizer ring 8, to synchronize the rotation rates of and engage the coupling sleeve 6 and the synchronized gear 7.

Next, the control input (Vin) of the sliding mode controller 40 is set using the sum of three control inputs, as shown in the following equation (38).

$$V\text{in}(k) = Usl(k) = Ueq(k) + Urch(k) + Uadp(k) \quad (38)$$

Here Vin(k) is the voltage applied to the electric motor 10 in the kth sampling period, Ueq(k) is the equivalent control input in the kth sampling period, Urch(k) is the reaching rule input in the kth control cycle, and Uadp(k) is the adapting rule input in the kth sampling cycle.

The equivalent control input is the input to constrain the deviation state amount (Esc(k), Esc(k−1)) to the switching function (σ=0); the reaching rule input is the input to place the state amount on the switching function; and the adapting rule input is the input to absorb model error and disturbances and place the state amount on the switching function.

Below, methods for setting the the equivalent control input (Ueq(k)), reaching rule input (Urch(k)), and adapting rule input (Uadp(k)) are explained.

First, the equivalent control input (Ueq), in a rigorous analysis, has a function to hold the deviation state amount at an arbitrary location on the phase plane. Consequently the equivalent control input (Ueq) is calculated as the applied voltage (Vin) satisfying the following equation (39).

$$\sigma(k+1) = \sigma(k) \quad (39)$$

Substituting the above equations (35) and (34) into equation (39), the following equation (40) is obtained.

$$Psc(k+1) - Psc\_cmd(k+1) + VPOLE\{Psc(k) - Psc\_cmd(k)\} = \quad (40)$$
$$Psc(k) - Psc\_cmd(k) + VPOLE\{Psc(k-1) - Psc\_cmd(k-1)\}$$

By substituting the above equation (33) into equation (40) and rearranging, the following equation (41) for the equivalent control input (Ueq) is obtained.

$$Ueq(k) = Vin(k) \quad (41)$$
$$= \frac{1}{b1}\{(1 - VPOLE - a1)Psc(k) +$$
$$(VPOLE - a2)Psc(k-1)\} + Psc\_cmd(k+1) +$$
$$(VPOLE - 1)Psc\_cmd(k) - VPOLE \cdot Psc\_cmd(k-1)$$

Next, the reaching rule input is calculated from the following equation (42).

$$Urch(k) = \frac{-F}{b1}(|\sigma(k)| + \Delta)sign(\sigma(k)) \quad (42)$$

Here F is the reaching rule gain, and Δ is the switching amplitude (a parameter to absorb mechanical backlash, play, and other nonlinear characteristics).

Further, if the switching amplitude (Δ) is set to zero (Δ=0), then the above equation (42) can be expressed in the form of the following equation (43).

$$Urch(k) = \frac{-F}{b1}\sigma(k) \quad (43)$$

The adapting rule input is calculated from the following equation (44).

$$Uadp(k) = \frac{-G}{b1} \cdot \sum_{i=0}^{k} \sigma(i) \quad (44)$$

Here G is the adapting rule gain.

Here, if the control input (Usl(k)) obtained by substituting the equivalent control input (Ueq(k)) of the above equation (41), the reaching rule input (Urch(k)) of the above equation (43), and the adapting rule input (Uadp(k)) of the above equation (44) into the above equation (38) is substituted into the above equation (33) as the voltage (Vin) applied to the electric motor 10, then the following equation (45) is obtained.

$$Psc(k+1) = a1\,Psc(k) + a2\,Psc(k-1) + b1Vin(k) \quad (45)$$
$$= a1\,Psc(k) + a2\,Psc(k-1) +$$
$$b1(Ueq(k) + Urch(k) + Uadp(k))$$
$$= a1\,Psc(k) + a2\,Psc(k-1) +$$
$$(1 - VPOLE - a1)Psc(k) + (VPOLE - a2)Psc(k-1) +$$
$$Psc\_cmd(k+1) + (VPOLE - 1)Psc\_cmd(k) -$$
$$VPOLE \cdot Psc\_cmd(k-1) - F\sigma(k) - G\sum_{i=0}^{k}\sigma(i)$$

And, if the above equations (34) and (35) are applied to the equation (45) and rearranged in terms of σ, then the following equation (46) is obtained.

$$\sigma(k+1) = (1-F)\sigma(k) - G\sum_{i=0}^{k} \sigma(i) \quad (46)$$

Here the roles of the reaching rule input (Urch(k)) and the adapting rule input (Uadp(k)) are to move the deviation state amount (Esc(k), Esc(k−1)) on the switching function (σ=0), that is, to stabilize the above equation (46) (σ→0), so that the reaching rule gain (F) and adapting rule gain (G) must be determined such that the above equation (46) is stable.

Upon performing a Z transformation of the above equation (46), the following equation (47) is obtained, and modification of the equation (47) yields the following equation (48).

$$Z \cdot \Sigma = (1-F)\Sigma - G\frac{T}{Z-1}\Sigma \quad (47)$$

$$Z^2 \cdot \Sigma + Z(F-2)\Sigma + (GT+1-F)\Sigma = 0 \quad (48)$$

In this case, the condition for the stability of the above equation (48) is that the coefficients of the second and third terms on the left side (F−2 and GT+1−F) be a combination which exists within the triangular region in FIG. 6, and so the values of F and G should be determined such that these coefficients are within this triangular region.

The sliding mode controller 40 determines the reaching rule input (Urch(k)) and adapting rule input (Uadp(k)) using equations (43) and (44), based on the values of F and G determined in this way, and uses the above equation (41) to determine the equivalent control input (Ueq(k)) and the above equation (38) to determine the voltage (Vin) applied to the electric motor 10.

Next, referring to FIG. 1, in an actual synchronizing mechanism 2, the coupling sleeve 6 must be pressed with constant force against the synchronizer ring 8 in order to cause the rates of rotation of the coupling sleeve 6 and the synchronized gear 7 to be synchronized. In the model shown in FIG. 2, a configuration is necessary in order to execute control so that, after the inertial system object 30 and the elastic system object 31 have made contact, a constant pressing force is applied by the inertial system object 30 against the elastic system object 31.

Here, the armature current (Im) of the electric motor 10 in the state in which the inertial system object 30 and the elastic system object 31 are in contact is given by the above equation (21); but because the acceleration of the inertial system object 30 during the interval in which rotation synchronization is attempted is expected to be zero (the second derivative of Psc is zero), the above equation (21) takes the form of the following equation (49).

$$Im = \frac{Rsc}{Km}Fsc \quad (49)$$

The constant pressing force is the reaction force of the force (Fsc) received by the inertial system object 30 from the elastic system object 31, and so in order to maintain the pressing force at a constant value, the following equation (50) should obtain.

$$Im = Im\_cmd \quad (50)$$

Here Im_cmd is the target current value.

The target current value (Im_cmd) is equivalent to the target value of the pressing force in this invention, the current detection portion 20 is equivalent to the pressing force ascertaining means of this invention, and the armature current (Im) of the electric motor 10 detected by the current detection portion 20 is equivalent to the pressing force of this invention.

On converting the above equation (50) into an equation in discrete time and computing the deviation between the actual armature current (Im) and the target current value (Im_cmd), the following equation (51) is obtained.

$$Eim(k) = Im(k) - Im\_cmd = 0 \quad (51)$$

Here, as is seen from the above equations (20) and (21), the synchronizing mechanism 2 is represented by a one-input, two-output system model which takes as input the voltage (Vin) applied to the electric motor 10, and takes as outputs the position (Psc) of the inertial system object 30 and the armature current (Im) of the electric motor 10.

However, until the inertial system object 30 and the elastic system object 31 make contact, it is sufficient to control only the position (Psc) of the inertial system object 30. Consequently the sliding mode controller 40 need only perform control in which the synchronizing mechanism 2 is represented by a one-input, one-output system model which takes the voltage (Vin) applied to the electric motor 10 as an input and takes the position (Psc) of the inertial system object 30 as an output.

Hence in order to perform feedback control of the armature current (Im) of the electric motor 10, the sliding mode controller 40 must switch between control of a one-input, one-output system mode and a one-input, two-output system model. However, if the sliding mode controller 40 is switched in this way, discontinuity in the input (Vin) occurs, and it becomes difficult to stabilize the control state at the time of switching of the sliding mode controller 40.

The voltage determining portion does not perform switching of the sliding mode controller 40, but as explained below, by adjusting the compliance parameter (VPOLE) which sets the compliance of the sliding mode controller 40 using feedback of the armature current (Im) of the electric motor 10, the pressing force by the inertial system object 30 against the elastic system object 31 is stabilized.

First, feedback control of the armature current (Im) is performed using simple sliding mode control (equivalent to the response specifying control of this invention) based on the following equations (52) through (57), taking into account (1) the speed of response of the armature current (Im) to the target current (Im_cmd), and (2) the stability of the armature current (Im) proportional to the pressing force.

$$E\_Im(k) = Im\_cmd - Im(k) \quad (52)$$

$$\sigma\_Im(k) = E\_Im(k) + POIE\_Im \cdot E\_Im(k-1) \quad (53)$$

$$Urch\_Im(k) = F\_Im \cdot \sigma\_Im(k) \quad (54)$$

$$Uadp\_Im(k) = G\_Im \cdot \sum_{i=0}^{k} \sigma\_Im(i) \quad (55)$$

$$VPOLE\_Im(k) = VPOLE\_bs + Urch\_Im(k) + Uadp\_Im(k) \quad (56)$$

$$VPOLE(k) = Limit(VPOLE\_Im(k)) \quad (57)$$

Here Limit is limit processing from −1 to 0, F_Im is the reaching rule gain, G_Im is the adapting rule gain, POLE_Im is a switching function setting parameter, VPOLE_bs is a VPOLE reference value, Urch_Im is the reaching rule input, and Uadp_Im is the adapting rule input.

A control block diagram of the current feedback system is shown in FIG. 7. In the control block diagram of FIG. 7, in place of using a sliding mode controller which controls a one-input, two-output system model, a dual-feedback system is employed comprising, in addition to a sliding mode controller 40 to control a one-input, one-output model, a current feedback portion 50a which controls the armature current (Im).

The current feedback portion 50a comprises the compliance parameter computation portion 41 shown in FIG. 3. The current deviation (E_Im, equivalent to the second state amount of this invention) of the above equation (52) is computed by the subtracter 51, and the value of the switching function ($\sigma$_Im, equivalent to the second linear function of this invention) is computed using the above equation (53) by the switching function computation portion 52. The reaching rule input (Urch_Im) is computed using the above equation (54) by the proportional computation unit 53, and the adapting rule input (Uadp_Im) is computed using the above equation (55) by the integrator 55 and integral multiplier 56.

The compliance parameter (VPOLE_Im) reflecting current feedback is computed by the adder 57 and the adder 58 using the above equation (56), limit processing is performed by the limiter 59 using the above equation (57), and the compliance parameter (VPOLE) for the sliding mode controller 40 is determined.

A switching function with the switching function of the above equation (55) set to 0 ($\sigma$_Im(k)=0) is equivalent to the second switching function of this invention, and the compliance parameter computed using the above equation (56) (VPOLE_Im) is equivalent to the second operation amount of this invention.

Next, the compliance parameter computation portion 41 shown in FIG. 3 performs the following three processes to set the compliance parameter (VPOLE) which sets the compliance of the sliding mode controller 40 controlling action of the synchronizing mechanism 2.

Process 1 (equivalent to the first process of this invention): Target value tracking control—control of the position (Psc) of the inertial system object 30, and control of the compliance at the time of contact of the inertial system object 30 and elastic system object 31. The compliance parameter (VPOLE) is determined according to the position (Psc) of the inertial system object 30.

Process 2 (equivalent to the second process of this invention): Rotation synchronization control—control of the force pressing on the elastic system object 31. The compliance parameter (VPOLE) is determined by feedback of the armature current of the electric motor 10 as described above.

Process 3: Stationary control—Control to halt the advancing behavior of the inertial system object 30 after rotation synchronization (after completion of engaging of the coupling sleeve 6 and synchronized gear 7 in the synchronizing mechanism 2). The compliance parameter (VPOLE) is held constant.

The compliance parameter computation portion 41 must perform stable process switching even when there is scattering or changes in the position of switching from process 1 to process 2 or in the timing of switching from process 2 to process 3, due to mechanical scattering in the synchronizing mechanism 2 or to aging. Below, the method for determining the process switching timing is explained.

The upper graph in FIG. 8 shows changes in the deviation (Esc=Psc−Psc_cmd) between the actual position (Psc, d in the figure) of the inertial system object 30 and the target position (Psc_cmd, e in the figure) during switching between processes; the vertical axis indicates the actual position (Psc) of the inertial system object 30 and the target position (Psc_cmd), and the horizontal axis indicates the time (t). As is clear from the graph, during switching between processes, the deviation (Esc) changes, as follows.

When switching from process 1 to process 2: Movement of the inertial system object 30 due to contact with the elastic system object 31 is suppressed, and a state is entered in which the actual position (Psc) lags with respect to the target position (Psc_cmd); the deviation (Esc) increases in the negative direction.

When switching from process 2 to process 3: Rotation synchronization of the elastic system object 31 and inertial system object 30 ends, and when the position of the inertial system object 30 (Psc) reaches the target position (Psc_cmd), the deviation (Esc) decreases in the positive direction.

Hence by detecting such changes in the deviation (Esc), switching between processes is performed, and as shown at the bottom of FIG. 8, the compliance parameter (VPOLE, f in the figure) may be set according to the different processes.

However, the actual synchronizing mechanism 2 shown in FIG. 1 is a controlled mechanism with substantial mechanical backlash, play, and friction. Consequently controllability is improved when the sampling period of the control apparatus 1 is set to a short value; but if the sampling period is set to a short value and the deviation (Esc) is computed, the SN ratio declines and it becomes difficult to detect changes in the deviation (Esc). Thus the wavelet transform filter 43 (see FIG. 3) comprised by the Vin determining portion 24 performs wavelet transform of the deviation (Esc) as explained below to extract only the low-frequency components of the deviation (Esc), and by this means detection of changes in the deviation (Esc) is facilitated.

A filter having a wavelet transform portion (hereafter called a wavelet transform filter) has the configuration shown in FIG. 9, and performs filtering by twice repeating the half-band low-pass filter processing and decimation processing of the following equation (58).

$$Gl(\eta) = 0.7071 \times u(\eta) + 0.7071 \times u(\eta-1) \quad (58)$$

Here u is the input data, and $\eta$ is the time-series number of the sampling period.

The first half-hand low-pass filter 70 shown in (a) of FIG. 9 performs the processing of the above equation (57) on the current sampling period input value (Esc(k)) and the previous sampling period input value (Esc(k−1)). The second half-band low-pass filter 71 performs the processing of the above equation (58) on the current and previous values of Esc_wv1(m1) (Esc_wv1(m1) and Esc_wv1(m1−−1)), resulting from decimation processing 72 of the output of the first half-band low-pass filter 70.

As shown in (b) of FIG. 9, the half-band low-pass filters 70, 71 impede frequency components above half the sampling frequency (the Nyquist frequency), and because the gain of the low-frequency components is greater than 1, the effect of amplifying the gain of the low-frequency components is obtained.

The decimation processing 72, 73 (2↓) in (a) of FIG. 9 is decimation processing; as shown in (a) of FIG. 10, decimation processing in which every other input data (u) is sampled is performed.

The wavelet transform filter 43 repeatedly performs processing by the half-band low-pass filters 70, 71 and decimation processing 72, 73, and by this means extracts the low-frequency components (Esc_wv) while increasing the gain as shown in the graph of (b) in FIG. 10. The vertical axis in the graph of (b) in FIG. 10 shows the gain, and the horizontal axis indicates the frequency.

By this means, the high-frequency components of the input signal (Esc) are eliminated, and the gain of the input signal (Esc) is increased, so that low-frequency components of the input signal (Esc) can be extracted with an improved SN ratio.

The compliance parameter computation portion 41 uses ΔEsc_wv (=Esc_wv(m)−Esc_wv(m−1)), which is the amount of change in the wavelet transform (Esc_wv) of the deviation (Esc), to perform switching between processes as follows.

Switching from process 1 to process 2: Psc>Psc_def, and in addition Esc_wv>X−SCCNT Switching from process 2 to process 3: Psc>Psc_def, and in addition ΔEsc_wv>X_SCDONE Here Psc_def is the VPOLE variable starting position in process 1, X_SCCNT is the Esc_wv contact judgment threshold, and X_SCDONE is the rotation synchronization completion judgment threshold.

In the above switching conditions, Esc_wv and ΔEsc_wv are equivalent to the degree of deviation of the actual position from the target position of this invention; X_SCCNT is equivalent to the prescribed level and first prescribed level of this invention; and X_SCDONE is equivalent to the prescribed level and second prescribed level of this invention.

The procedure for control of the action of a synchronizing device 2 by means of a control apparatus 1 configured by the method explained above is explained, following the flowchart shown in FIG. 11. When the control apparatus 1 receives from the automobile main controller (not shown) a signal specifying shifting of the transmission, processing proceeds from step 1 to step 2.

The control apparatus 1 employs the target position setting portion 22 to set the movement pattern of the coupling sleeve 6 as target positions (Psc_cmd), as shown in (a) of FIG. 12, according to the shift position (first speed, second speed, . . . , neutral) selected by the main controller. The control apparatus 1 also sets the modification position (Psc_vp) of the compliance parameter (VPOLE) in process 1 and the standby position (Psc_def) of the synchronizer ring 8.

In the subsequent step 3, the control apparatus 1 uses the actual position ascertaining portion 21 to compute the deviation (Esc) of the actual position (Psc) of the coupling sleeve 6, computed using the above equation (33), from the target position (Psc_cmd). In the figure, k indicates the kth sampling period; Psc(k) and Psc_cmd(k) respectively denote the actual position and target position of the coupling sleeve 6 in the kth sampling period.

Next, in step 4 the control apparatus 1 uses the above-described wavelet transform filter 43 to perform processing, to compute the wavelet transform (Esc_wv) of the deviation (Esc). In the figure, Esc_wv(m) is the wavelet transform value computed based on the deviation (Esc(k)) in the kth sampling period, as shown in (a) of FIG. 9.

Then, in steps 5 through 7 as processing to judge the timing for switching between each of the above-described processes (process 1, process 2, process 3), the conditions for switching from process 1 to process 2 are set in step 5 and step 6, and in step 7 the conditions for switching from process 2 to process 3 are set.

First, in step 5, until the actual position (Psc(k)) of the coupling sleeve 6 passes the standby position (Psc_def) of the synchronizer ring 8, processing branches to step 20, and the compliance parameter computation portion 41 sets the compliance parameter (VPOLE) to close to 0 (for example, −0.2), according to the compliance parameter (VPOLE) settings table shown in (b) of FIG. 12. In the settings table shown in (b) of FIG. 12, the vertical axis indicates the compliance parameter (VPOLE), and the horizontal axis indicates the actual position of the coupling sleeve 6 (Psc).

By this means, the compliance of the synchronizing mechanism 2 is held low from the time motion of the coupling sleeve 6 starts until the compliance parameter (VPOLE) modification position (Psc_vp) is reached, so that the coupling sleeve 6 can be moved with stability, suppressing the effects of disturbances.

When the coupling sleeve 6 passes the compliance parameter (VPOLE) modification position (Psc_vp), the compliance parameter computation portion 41 lowers the compliance parameter (VPOLE) to close to −1 (for example, −0.99). In this way, by lowering the value of the compliance parameter (VPOLE) in advance immediately before the coupling sleeve 6 and synchronizer ring 8 actually make contact, to raise the compliance of the synchronizing mechanism 2, the shock occurring when the coupling sleeve 6 makes contact with the synchronizer ring 8 can be alleviated.

In the following step 6, when the condition Esc_wv(m)>X_SCCNT which is the condition for switching from the above-described process 1 to process 2 obtains, that is, when contact of the coupling sleeve 6 with the synchronizer ring 8 is detected, processing proceeds to step 7. In step 7, when the condition ΔEsc_wv(m)>SCDONE which is the condition for switching from the above-described process 2 to process 3 obtains, that is, when rotation synchronization between the coupling sleeve 6 and synchronizer ring 8 is achieved, and the coupling sleeve 6 passes the synchronizer ring 8 and engages with the synchronized gear 7, processing branches to step 30.

On the other hand, when in step 7 the condition ΔEsc_wv(m)>SCDONE is not met, processing proceeds to step 8, and the compliance parameter computation portion 41 executes processing to compute the compliance parameter (VPOLE) due to the above-described current feedback. The voltage determining portion 24 uses the compliance parameter (VPOLE) computes in this way to compute the voltage (Vin) applied to the electric motor 10 by the sliding mode controller 40, and applies this applied voltage (Vin) to the electric motor 10.

In this way, in process 2 the armature current (Im) of the electric motor 10 is maintained at the target current (Im_cmd) through feedback of the armature current (Im) of the electric motor 10, the output torque of the electric motor 10 is controlled so as to be constant, and the pressing force of the coupling sleeve 6 against the synchronizer ring 8 can be stabilized.

By this means, the coupling sleeve 6 can be prevented from pressing with excessive force against the synchronizer ring 8 and causing damage to the synchronizing mechanism 2.

In process 3, in step 30 the compliance parameter (VPOLE) is set to a constant value (X_VPOLE_END) by the compliance parameter computation portion 41. The voltage determining portion 24 uses this compliance parameter (VPOLE=X_VPOLE_END) to compute the voltage (Vin) for the sliding mode controller 40 to apply to the electric motor 10, and this applied voltage (Vin) is applied to the electric motor 10 to rapidly halt the motion of the coupling sleeve 6.

By this means, even after engaging of the coupling sleeve 6 with the synchronized gear 7 has been completed, the coupling sleeve 6 can be prevented from pressing with excessive force against the synchronized gear 7 and causing damage or similar to the synchronizing mechanism 2.

In this aspect, as stated above, switching is performed from control to determine the compliance parameter (VPOLE) according to the position of the inertial system object 30 in process 1 when the position (Psc) of the inertial system object 30 reaches the target position (Psc_cmd), to control to determine the compliance parameter (VPOLE) according to the force pressing on the elastic system object 31 in process 2 (proportional to the magnitude of the armature current of the motor 10); but depending on the specifications of the mechanism for driving by the actuator, the conditions for control switching may be set according to changes in the armature current (Im) of the electric motor 10.

Further, in this aspect the compliance parameter (VPOLE) is determined by performing the above-described computation processing in the current feedback portion 50a based on the configuration shown in FIG. 7; but as another configuration, as shown in FIG. 13, a current feedback portion 50b may be used comprising a correlation map 60 in which is set in advance the relation between the current deviation (Im–Im_cmd) and the compliance parameter (VPOLE), to determine the compliance parameter (VPOLE) by applying the current deviation (Im–Im_cmd) to the correlation map 60.

As another configuration, the current feedback portion 50c shown in FIG. 14 may be used to perform I-PD control and determine the compliance parameter (VPOLE). The subtracter 51, adder 58, and limiter 59 are similar to those portions with the same symbols in the configuration of the current feedback portion 50a shown in FIG. 7.

In the current feedback portion 50c, the following equations (59) and (60) are used to compute the compliance parameter (VPOLE(k)). Specifically, the second term on the right-hand side of equation (59) is computed by the proportional computing unit 61, the third term on the right-hand side of equation (59) is computed by the Z-transformer 62, subtracter 63 and differentiator 64, and the fourth term on the right-hand side of equation (59) is computed by the subtracter 51 and integrator 66.

$$VPOLE\_Im(k) = VPOLE\_bs + KIMP \cdot Im(k) + \quad (59)$$
$$KIMD\{Im(k) - Im(k-1)\} +$$
$$KIMI \cdot \sum_{i=0}^{k} E\_Im(i)$$

Here VPOLE_Im(k) is the compliance parameter in the kth sampling period, VPOLE_bs is the compliance parameter reference value, KIMP is the feedback gain of the proportional term, KIMD is the feedback gain of an integration term, KIMI is the feedback gain of an integration term, and Im(k) is the armature current of the motor 10 in the kth sampling period.

$$E\_Im(k)=Im(k)-Im\_cmd \quad (60)$$

Here Im_cmd is the target current value.

Addition of the terms on the right side of the above equation (59) is performed by the adders 67, 68 and 58 to compute VPOLE_Im(k), limit processing of the above equation (57) is performed by the limiter 59, and the compliance parameter (VPOLE(k)) is determined.

In this aspect, as shown in FIG. 1, a synchronizing mechanism 2 is addressed in which the coupling sleeve 6 is provided on the side of the input shaft 5 and the synchronized gear 7 is connected to the driving shaft; but this invention can also be applied to a synchronizing mechanism in which the coupling sleeve is provided on the output shaft side, and the synchronized gear is connected to the input shaft.

In this aspect, the voltage determining portion 24 uses an adaptive sliding mode having an adapting rule input which takes the effect of disturbances into consideration; but general sliding mode control which omits the adapting rule input may be used, and use in other types of response specifying control, such as for example back-stepping control, is also possible. The voltage determining portion 24 performs current feedback processing using sliding mode control; but the advantageous results of this invention can be obtained even when current feedback processing is performed, without using sliding mode control.

In this aspect, the actual position (Psc) of the coupling sleeve 6 is ascertained by the actual position ascertaining portion 21 based on the model shown in FIG. 2. But a position sensor may be provided, and the actual position (Psc) of the coupling sleeve 6 ascertained directly from the position detection signal of the position sensor and from the lever ratio between the motor 10 and coupling sleeve 6.

Further, in this aspect an example of application of this invention to a synchronizing mechanism 2 comprised by the transmission of an automobile is presented; but applications of this invention are not limited thereto. For example, FIG. 15 shows an example in which a machine tool which performs hole opening in a workpiece 80 using an end mill 81 is modeled, taking the end mill 81 to be the inertial system object and the workpiece 80 to be the elastic system object, to which this invention is applied. The end mill 81 is mounted using a chuck 82 onto the vertically moving actuator 83.

As shown in FIG. 15, similarly to the case of control of the above-described synchronizing mechanism 2, the process of performing hole opening is divided into the following three processes.

Process 1: Until contact of the end mill 81 with the workpiece 80, the tip of the end mill 81 is caused to reach the workpiece 80 in a short period of time, and moreover the shock at the time of contact of the end mill 81 and the workpiece 80 is suppressed.

Process 2: The workpiece 80 is machined while applying a constant pressing force (Fc) to the end mill 81.

Process 3: When hole opening in the workpiece 80 is completed and there is no more resistance from the workpiece 80, the end mill 81 suddenly drops downward, and so the dropping of the end mill 81 is halted in order that the chuck 82 does not collide with the workpiece 80.

Replacing the actual position (Psc) of the coupling sleeve 6 in the synchronizing mechanism 2 shown in FIG. 1 with the actual position (Py) of the end mill 81, and by setting the modification position (Py_vp, equivalent to Psc_vp in the control of the synchronizing mechanism 2) of the compliance parameter (VPOLE) in process 1, the standby position (Py_def, equivalent to Psc_def in the control of the synchronizing mechanism 2) of the workpiece 80 and similar, and by controlling the action of the vertically moving actuator 83, the hole opening time can be shortened, and shocks at the time of contact of the end mill 81 and workpiece 80 can be alleviated.

In process 2, the end mill 81 is prevented from applying excessive pressing force to the workpiece 80, and the pressing force of the end mill 81 can be maintained at a prescribed target pressing force; and in process 3, the end mill 81 can be halted promptly.

In this aspect, an example in which an electric motor 10 is used as the actuator of the invention is explained, but this invention can also be applied to cases in which various other electrical actuators as well as pneumatic and hydraulic actuators are used.

In this aspect, an example is explained in which the first state value of the invention is the position of an object moved by the actuator and the second state value of the invention is the magnitude of the force acting on the object; but this invention can also be applied to cases in which the action of the actuator is controlled using various other state values.

What is claimed is:

1. An actuator control apparatus, relating to a control object having a plurality of state values changed according to an action of an actuator, comprising:
   first state value ascertaining means, which ascertains a first state value which changes according to the action of an actuator;
   second state value ascertaining means, which ascertains a second state value different from the first state value which changes according to the action of the actuator; and
   operation amount determining means, which uses a first response specifying control capable of variably specifying the attenuation behavior and attenuation speed of a deviation of the first state value from a first target value such that said first state value matches the first target value, taking at least the deviation as a first state amount, to determine a first operation amount to drive said actuator such that the first state amount is made to converge on an equilibrium point on a first switching function stipulated by a first linear function which takes as a variable the first state amount, and which determines the response characteristic of said first response specifying control such that said second state value matches a second target value.

2. The actuator control apparatus according to claim 1, wherein said operation amount determining means uses a second response specifying control capable of variably specifying the attenuation behavior and attenuation speed of a deviation of said second state value from said second target value, taking at least the deviation as a second state amount, to determine the response characteristic of said first response specifying control such that the second state amount is caused to converge on an equilibrium point on a second switching function stipulated by a second linear function which takes as a variable the second state amount.

3. The actuator control apparatus according to claim 2, wherein said operation amount determining means determines the response characteristic of said first response specifying control by modifying a computation coefficient of said first linear function.

4. The actuator control apparatus according to claim 3, wherein said operation amount determining means takes said computation coefficient as a second operation amount, and determines the second operation amount such that said second state amount is made to converge on an equilibrium point on said second switching function.

5. The actuator control apparatus according to any one of claims 1 through 4, wherein said actuator comprises a driving source which moves a moveable body, said first state value comprises the position of motion of said moveable body, and said second state value comprises the magnitude of the force acting on said moveably body through action of said actuator.

6. The actuator control apparatus according to claim 5, comprising:
   means for controlling an action of a contact mechanism comprising a contact body provided moveably along one shaft direction, said actuator connected to the contact body to move the contact body, and a contacted body which makes contact with the contact body when the contact body moves to a prescribed position, and executing a process of moving, by means of said actuator, said contact body past said prescribed position to press against said contacted body;
   target position setting means which sets the target position of said contact body in said process as said first target value;
   as said first state value ascertaining means, actual position ascertaining means which ascertains the actual position of said contact body as said first state value; and,
   as said second state value ascertaining means, pressing force ascertaining means which ascertains, as said second state value, the pressing force of said contact body against said contacted body.

7. The actuator control apparatus according to claim 6, wherein said actuator comprises an electrical actuator the output of which changes according to the magnitude of a supplied current, said first operation amount comprises the voltage supplied to the electrical actuator, and said pressing force ascertaining means detects the current supplied to the electrical actuator and ascertains the pressing force of said contact body against said contacted body based on the supplied current.

8. The actuator control apparatus according to claim 7, wherein said contact mechanism comprises a synchronizing mechanism which switches between power transmission and disconnection; and,
   said contact body comprises a first engaging member, provided integrally rotatably on a shaft, and said contacted body comprises a synchronizing member, provided on said shaft between a second engaging member capable of relative rotation and immovably along the shaft and the first engaging member, capable of rotation relative to the first engaging member and the second engaging member and capable of movement in said shaft direction, which by means of a friction force occurring when in contact with the first engaging member and the second engaging member in a state in which said shaft is rotating, is capable of synchronizing the rates of revolution of the first engaging member and the second engaging member, and of engaging the first engaging member and the second engaging member.

9. An actuator control apparatus, comprising:
   first state value ascertaining means, which ascertains a first state value which changes according to the action of an actuator;
   second state value ascertaining means, which ascertains a second state value differing from the first state value which changes according to the action of the actuator; and operation amount determining means, which uses response specifying control capable of variably specifying the attenuation behavior and attenuation speed of a deviation of the first state value and a first target value such that said first state value matches the first target value, to determine the operation amount to drive said actuator such that the value of a switching function stipulated by a linear function is made based at least on the deviation to converge on zero, and in addition performs switching, according to said first state value or to said second state value, to set the response characteristic of said response specifying control either according to said first state value, or such that said second state value matches a second target value.

10. The actuator control apparatus according to claim 9, wherein said operation amount determining means sets the response characteristic of said response specifying control by modifying a computation coefficient of said linear function.

11. The actuator control apparatus according to claim 9 or claim 10, wherein said actuator comprises a driving source which moves a moveable body, said first state value comprises the position of motion of said moveable body, and said second state value comprises the magnitude of the force acting on said moveable body through the action of said actuator.

12. The actuator control apparatus according to claim 11, comprising:
 means for controlling an action of a contact mechanism comprising a contact body provided moveably along one shaft direction
 means for controlling an action of a contact mechanism comprising a contact body provided moveably along one shaft direction, said actuator connected to the contact body to move the contact body, and a contacted body which makes contact with the contact body when the contact body moves to a prescribed position, and said actuator control apparatus executing a first process of moving, by means of said actuator, from a state in which said contact body and said contacted body are in an opposing state with an interval therebetween, said contact body to press against said contacted body, and a second process, in succession to the first process, of moving, by means of said actuator, said contact body past said prescribed position to press against said contacted body;
 target position setting means which sets the target position of said contact body in said first process and in said second process;
 as said first state value ascertaining means, actual position ascertaining means which ascertains the actual position of said contact body as said first state value;
 as said second state value ascertaining means, pressing force ascertaining means which ascertains, as said second state value, the pressing force of said contact body against said contacted body; and,
 said operation amount determining means, in said first process, sets the response characteristic of said response specifying control according to the actual position of said contact body, and in said second process, sets the response characteristic such that the pressing force ascertained by said pressing force ascertaining means matches the prescribed target pressing force.

13. The actuator control apparatus according to claim 12, wherein, when in said first process the degree of deviation of the actual position of said contact body from said target position increases to greater than a first prescribed level, said operation amount determining means initiates processing to set the response characteristic of said response specifying control such that the pressing force ascertained by said pressing force ascertaining means matches said target pressing force.

14. The actuator control apparatus according to claim 13, wherein, when in said second process the degree of deviation of the actual position of said contact body from said target position decreases to greater than a second prescribed level, said operation amount determining means determines said operation amount such that movement of said contact body is halted.

15. The actuator control apparatus according to claim 14, wherein, when in said second process the degree of deviation of the actual position of said contact body from said target position decreases to greater than said second prescribed level, said operation amount determining means sets the response characteristic of said response specifying control in the direction of increasing ability to suppress disturbances.

16. The actuator control apparatus according to claim 15, wherein said operation amount determining means ascertains the degree of deviation of the actual position of said contact body from said target position based on the converted value resulting from filtering of time-series data of the deviation of the actual position of said contact body and the target position using a wavelet transform.

17. The actuator control apparatus according to claim 16, wherein said contact mechanism comprises a synchronizing mechanism which switches between power transmission and disconnection; and,
 said contact body comprises a first engaging member, provided integrally rotatably on a shaft, and said contacted body comprises a synchronizing member, provided on said shaft between a second engaging member capable of relative rotation and immovably along the shaft and the first engaging member, capable of rotation relative to the first engaging member and the second engaging member and capable of movement in said shaft direction, which by means of the friction force occurring when in contact with the first engaging member and the second engaging member in a state in which said shaft is rotating, is capable of synchronizing the rates of revolution of the first engaging member and the second engaging member, and of engaging the first engaging member and the second engaging member.

* * * * *